US008854342B2

(12) United States Patent
DiVerdi

(10) Patent No.: US 8,854,342 B2
(45) Date of Patent: Oct. 7, 2014

(54) SYSTEMS AND METHODS FOR PARTICLE-BASED DIGITAL AIRBRUSHING

(71) Applicant: Stephen J. DiVerdi, Oakland, CA (US)

(72) Inventor: Stephen J. DiVerdi, Oakland, CA (US)

(73) Assignee: Adobe Systems Incorporated, San Jose, CA (US)

( * ) Notice: Subject to any disclaimer, the term of this patent is extended or adjusted under 35 U.S.C. 154(b) by 166 days.

(21) Appl. No.: 13/625,331

(22) Filed: Sep. 24, 2012

(65) Prior Publication Data

US 2013/0229391 A1    Sep. 5, 2013

Related U.S. Application Data

(60) Provisional application No. 61/606,232, filed on Mar. 2, 2012.

(51) Int. Cl.
*G06F 3/033* (2013.01)

(52) U.S. Cl.
USPC ........................................ 345/179; 178/19.01

(58) Field of Classification Search
CPC ....... G06F 17/50; G06F 3/048; G06F 3/0484; G06F 3/0488; G06F 3/04883; G06F 3/0346; G06F 3/033; G06F 3/0386; G06F 3/03542; G06F 3/03545; G06T 11/001; G06T 11/003; G06T 11/20
USPC .............................. 345/179; 178/19.01–19.06
See application file for complete search history.

(56) References Cited

U.S. PATENT DOCUMENTS

| 5,592,597 A | 1/1997 | Kiss |
| 2010/0181121 A1 | 7/2010 | Tremblay |
| 2011/0251829 A1 | 10/2011 | Baxter, III et al. |
| 2013/0229389 A1 | 9/2013 | DiVerdi |
| 2013/0229390 A1 | 9/2013 | DiVerdi |

OTHER PUBLICATIONS

U.S. Appl. No. 13/625,331, filed Sep. 24, 2012, 75 pages.
Baxter, William "Simple Data-Driven Modeling of Brushes", *Proceedings of the 2010 ACM SIGGRAPH symposium on Interactive 3D Graphics and Games (I 3D 201 010)*, Association for Computing Machinery, Inc., (Feb. 2010), 8 pages.
Chu, Nelson et al., "Detail-Preserving Paint Modeling for 3D Brushes", *Proceedings of the 8th International Symposium on Non-Photorealistic Animation and Rendering (NPAR 201 0)*, Association for Computing Machinery Inc., (Jun. 7, 2010), 8 pages.
Rudolf, Dave et al., "Simulating Wax Crayons", *Proceedings of the 11th Pacific Conference on Computer Graphics and Applications, PG '03*, (2003),10 pages.

(Continued)

*Primary Examiner* — Stephen Sherman
(74) *Attorney, Agent, or Firm* — Wolfe-SBMC

(57) ABSTRACT

A graphics application for simulating natural media drawing and painting may model a tablet stylus as if it were a virtual airbrush tool that sprays paint on a virtual canvas (tablet). The application may compute a conical shape of the paint spray, a target area in which to create an airbrush mark, and a target distribution of the paint to be deposited within the target area based on values of configurable parameters of the application and on 6DOF data collected from the tablet stylus and the tablet. The target distribution shape may be based on a hardness parameter. The virtual airbrush tool may create the mark using texture projection or by emitting multiple individual paint particles, which may have random sizes and velocity directions. In a hybrid mode, a granularity parameter may control the relative contributions of texture projection and particle emission in creating a given airbrush mark.

20 Claims, 22 Drawing Sheets

(56) References Cited

OTHER PUBLICATIONS

Van Haevre, William et al., "From Dust till Drawn: A Real-time Bidirectional Pastel Simulation", *The Visual Computer*, vol. 23 (Nos. 9-11), (2007), 8 pages.

Jonathan Konieczny and Gary Meyer. Airbrush simulation for artwork and computer modeling. In Proceedings of the 7th International Symposium on Non-Photorealistic Animation and Rendering, New Orleans, Aug. 1-9, 2009. pp. 61-69.

Stephen DiVerdi, Aravind Krishnaswamy, and Sunil Hadap. Industrial-strength painting with a virtual bristle brush. In Proceedings of the 17th Symposium on Virtual Reality Software and Technology, Hong Kong, Nov. 22-24, 2010, pp. 119-126.

Robert Lansdale. Texture mapping and resampling for computer graphics. Master's thesis, University of Toronto, 1991.

Lance Williams. Pyramidal parametrics. In Computer Graphics, vol. 17, No. 3, pp. 1-11. Proceedings of SIGGRAPH '83. 1983.

Rudolf, D., Mould, D. and Neufeld, E. (Mar. 2005), A Bidirectional Deposition Model of Wax Crayons. Computer Graphics Forum, vol. 24, issue 1: pp. 27-39.

U.S. Appl. No. 13/562,635, filed Jul. 31 2012, Stephen J. Diverdi.

"Non-Final Office Action", U.S. Appl. No. 13/562,635, Feb. 20, 2014, 10 pages.

"Notice of Allowance", U.S. Appl. No. 13/562,635, Aug. 20, 2014, 4 pages.

"Non-Final Office Action", U.S. Appl. No. 13/485,535, Jun. 13, 2014, 6 pages.

"Final Office Action", U.S. Appl. No. 13/562,635, Jun. 24, 2014, 7 pages.

legend for FIGs. 13A-13C

—— y(x) target composite falloff
--- t(x) texture falloff
•••• p(x) particle falloff

SYSTEMS AND METHODS FOR PARTICLE-BASED DIGITAL AIRBRUSHING

This application claims benefit of priority of U.S. Provisional Application Ser. No. 61/606,232 entitled "Methods and Apparatus for Particle-Based Digital Airbrushing" filed Mar. 2, 2012, the content of which is incorporated by reference herein in its entirety.

BACKGROUND

Description of the Related Art

Digital images may include raster graphics, vector graphics, or a combination thereof. Raster graphics data (also referred to as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. Vector graphics data may be stored and manipulated as one or more geometric objects built with geometric primitives. The geometric primitives (e.g., points, lines, polygons, Bézier curves, and text characters) may be based upon mathematical equations to represent parts of digital images.

Digital image processing is the process of analyzing and/or modifying digital images using a computing device, e.g., a computer system. Using specialized software programs, digital images may be manipulated and transformed in a variety of ways. For example, digital images may be created and/or modified using natural media drawing and/or painting simulation. Natural media drawing and/or painting simulation refers to digital, computer-based creation techniques for creating digital drawings, digital paintings, or other digital works that attempt to mimic real-world techniques and results for drawing (e.g., using a pencil and canvas) and/or painting (e.g., using a brush, palette, and canvas).

Real-world airbrushes work by dissolving pigment in a liquid medium and then spraying the solution through a nozzle with pressurized air. The physics of this mechanism can be leveraged to produce a variety of effects that artists can use to create art in a wide variety of styles. While airbrush tools are found in a variety of existing digital painting applications, they generally lack the expressive qualities of a real artist's paintbrush, including the texture of strokes and the response to changes in how the tool is held. For example, these tools lack support for input controls and/or continuously variable spatter effects that could realistically mimic the real-world workflows and painting effects that can be created by real-world artists using real-world airbrushes.

SUMMARY

Various embodiments of methods and apparatus for natural media drawing and/or painting using tablet stylus poses and gestures are described. Some embodiments may provide methods for performing various digital painting and/or drawing tasks using a natural, gesture-based approach via a tablet type device and a stylus. Some embodiments may provide detection of stylus poses and/or gestures that mimic the real-world actions of artists in real (as opposed to digital) drawing and painting, and may perform appropriate digital painting and drawing actions in response to detecting one or more of the stylus poses and/or gestures. By supporting the use of stylus poses and gestures that mimic those used in real-world actions, the system may lower the cognitive load of the user and allow the user to focus on creativity as opposed to the workings of and user interfaces provided by conventional graphics applications. Some embodiments may enable posed-based and/or gesture-based natural media drawing and painting workflows by providing a set of six degrees of freedom (6DOF) stylus-based gestures for use with stylus and tablet input technologies, which may be augmented with additional hardware, and by mapping these stylus gestures and other stylus poses to drawing and painting tasks in a natural media model.

Using a stylus, tablet, and software such as a tablet/stylus input module of a graphics application, embodiments may collect data from the stylus and/or tablet in response to user manipulation of the stylus and/or tablet to, for example, perform various user manipulation tracking tasks including but not limited to acceleration, position, orientation, and proximity detection for the stylus, and touch and pressure detection for the tablet. The collected data may be used to recognize various stylus poses and/or gestures in real-time or near-real time; the recognized stylus poses and/or gestures may be mapped to appropriate real-world drawing and painting actions that are then simulated in the graphics application as described herein.

Stylus gestures that may be detected in embodiments may include, but are not limited to: translations in one or more dimensions, rotations (including barrel rotations involving twisting about the major axis of the stylus), fanning motions (in which the tip of the stylus is waved back and forth above the tablet), a mashing down motion (i.e. pressing the stylus into the tablet with high pressure), a jerking up motion (i.e. a quick motion away from the tablet), a jerking down motion (i.e. a quick motion towards the tablet), shaking the stylus away from the tablet (e.g., performed by holding the stylus by its end and flicking the wrist), and shaking the stylus toward the tablet (e.g., performed by holding stylus by its end and flicking the wrist).

The stylus poses and/or gestures and their mapping to natural media painting actions as provided by various embodiments of the systems and methods described herein may provide advantages over conventional widget-based user interfaces for natural media drawing and painting for at least the reason that the stylus gestures and their applications in natural media painting may reduce the cognitive load of the user for those tasks, since the gestures are aligned with pre-existing motor skills cultivated by traditional drawing and painting techniques, and since the gestures can be executed in-place with the artwork, which alleviates the need to shift focus away from the art to manipulate widgets.

In some embodiments, the digital painting applications described herein may model a tablet stylus as if it were a physically-inspired virtual airbrush tool that sprays paint on a virtual canvas (i.e., the tablet). In some embodiments, the application may use a particle model to create a variable granular quality, and may take advantage of the six degree of freedom (6DOF) input of a tablet stylus to achieve the same variations in shape due to the virtual brush pose that can be created by corresponding manipulations of real-world airbrush mechanisms. The application may be configured to collect information about the pose of the stylus during a stroke made by the stylus on a tablet. For example, in some embodiments, the collected information may include information from the stylus indicating, among other things, the position and orientation of the stylus.

In some embodiments, the application may be configured to compute a conical shape with which to model paint spraying from the tip of the airbrush tool, which may involve constructing a three-dimensional geometry representing the spray of the paint, dependent on the collected pose information. In some embodiments, the conical shape may also be dependent on the value of a configurable cutoff angle and/or on the pressure exerted by the stylus on the tablet. The application may also be configured to determine a target area on the virtual canvas in which to deposit the paint, based on the intersection of the three-dimensional geometry and the virtual canvas. In some embodiments, the application may be configured to determine a target distribution of the paint to be deposited within the target area based on values of one or more default or configurable parameters of the application (e.g., a hardness value).

In various embodiment, the virtual airbrush tool described herein may create an airbrush mark using texture projection and/or by emitting multiple individual paint particles within the target area on the virtual canvas, according to the determined distribution. In some embodiments, the individual particles emitted by the virtual airbrush tool to create a given mark may have random sizes (within a specified range) and velocity directions. The number of particles emitted by the virtual airbrush tool may be fixed, may be configurable by a user, or may be computed by the application such that it is sufficient to create a mark in accordance with a determined distribution, in different embodiments. In a hybrid mode, a granularity parameter may control the relative contributions of texture projection and particle emission in creating a given airbrush mark.

Figure 1:
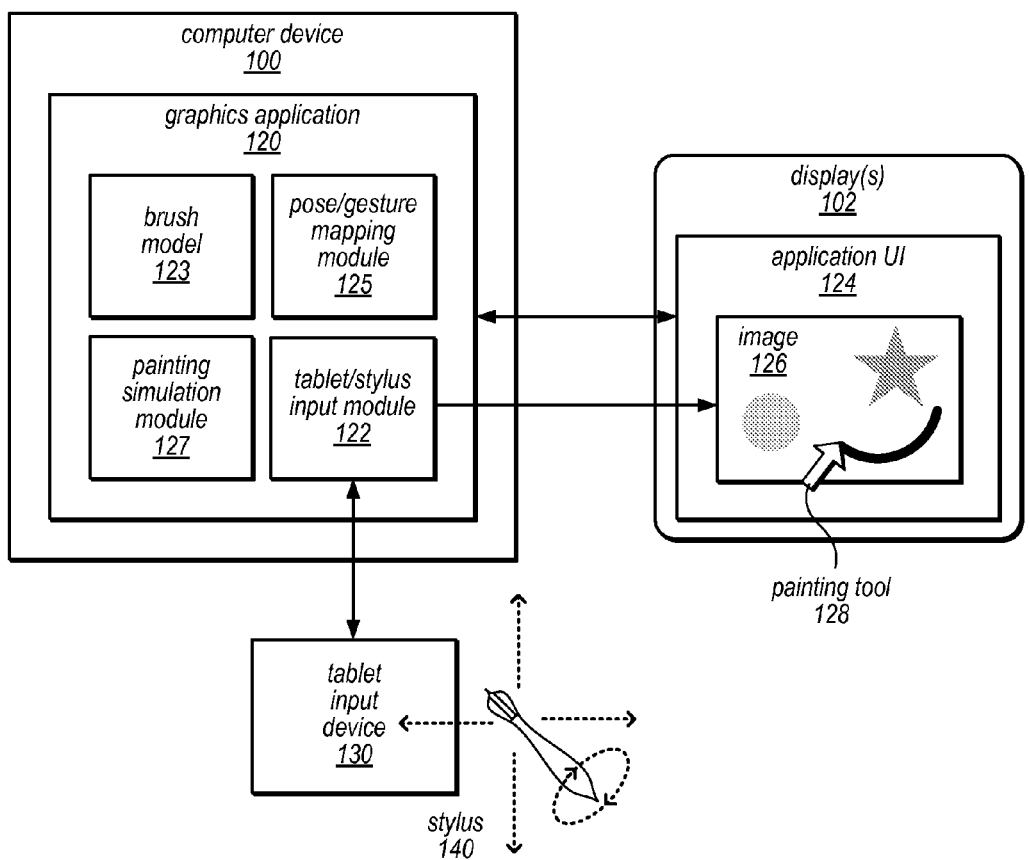
FIG. 1 is a block diagram illustrating one embodiment of a computer device that implements a natural media drawing and painting application employing a tablet and a stylus device, as described herein.

While various embodiments are described herein by way of example for several embodiments and illustrative drawings, those skilled in the art will recognize that embodiments are not limited to the embodiments or drawings described. It should be understood, that the drawings and detailed description thereto are not intended to limit the embodiments to the particular form disclosed, but on the contrary, the intention is to cover all modifications, equivalents and alternatives falling within the spirit and scope of the disclosure. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for particle-based digital airbrushing are described. Various embodiments may provide methods for performing various digital painting and drawing tasks using a natural, posed-based and/or gesture-based approach via a tablet, stylus, and software such as the tablet/stylus input module of the graphics application described herein. Some embodiments may provide detection of stylus gestures that mimic the real-world actions of artists in real (as opposed to digital) painting and drawing and stylus poses the mimic the way in which real-world artists create different effects by manipulating the pose (e.g., the orientation, position, and/or tilt) of a brush, pencil, oil pastel, charcoal, crayon, airbrush, or other natural media vehicle, and may perform appropriate digital painting and drawing actions and/or produce appropriate painting and drawing effects in response to detecting the stylus poses and/or gestures. This may in some embodiments lower the cognitive load of the user, and allow the user to focus on creativity as opposed to the workings of and user interfaces provided by conventional graphics applications. Various embodiments may enable gesture-based natural media painting workflows by providing a set of six degrees of freedom (6DOF) stylus-based gestures and poses for use with stylus and tablet input technologies, which may be augmented with additional hardware, and by mapping these stylus gestures and poses to painting tasks and effects in a natural media model.

Using a stylus, tablet, and software such as a tablet/stylus input module of a graphics application, such as that illustrated in FIG. 1, some embodiments may collect data from the stylus and/or tablet in response to user manipulation of the stylus and/or tablet to perform various user manipulation tracking tasks. The collected data may include, but is not limited to, acceleration, position, orientation, and proximity data detected for or by the stylus, and touch and pressure data detected for or by the tablet. The collected data may be used to recognize various stylus poses and/or gestures in real-time or near-real time, and the recognized stylus poses and/or gestures may be mapped to appropriate real-world painting and drawing actions that are then simulated in the graphics application as described below.

FIG. 1 illustrates an example graphics workstation or other computing device that is configured to implement the systems and methods described herein, according to various embodiments. As illustrated in this example, the workstation may include, but is not limited to, a computer device 100, one or more displays 102, a tablet input device 130, and a stylus 140. An example computer device which may be used in some embodiments is further illustrated in FIG. 18. As illustrated in this example, computer device 100 may implement a graphics application 120, which may be a natural media painting application, as described herein. Graphics application 120 may include a brush model 123, a painting simulation module 127, a tablet/stylus input module 122, and/or a pose/gesture mapping module 125. In some embodiments, brush model 123 may be a component of painting simulation module 127.

Graphics application 120 may provide a user interface (UI) 124, which may be presented to a user via one or more displays 102. Graphics application 120 may display, for example in a window provided by the UI 124 on the one or more displays 102, an image 126 that a user is currently working on (e.g., either creating or editing). Graphics application 120 may provide a painting or drawing tool 128 that the user may manipulate, for example via tablet 130 and/or stylus 140, to create or edit content in image 126. The tool 128 may, for example, have various modes that emulate a paintbrush, pencil, charcoal, crayon, oil pastel, eraser, airbrush, spray can, and so on. While embodiments are generally described as providing gesture-based manipulations of a paintbrush tool, it is to be noted that similar techniques may be applied to other types of painting or drawing tools.

Stylus 140 may be configured to be held in a hand of the user and to be manipulated by the user in relation to tablet 130 to perform various image editing operations or other tasks. The user may manipulate stylus 140 and/or tablet 130 in various ways. For example the user may move stylus 140 away from tablet 130 or towards tablet 130; move stylus 140 up and down, left and right, or diagonally and so on in relation to tablet 130; rotate stylus 140 on one or more axes; touch a touch and/or pressure sensitive surface of tablet 130 with stylus 140 and/or with a finger, knuckle, fingernail, etc.; apply varying amounts of pressure to the touch and pressure sensitive surface of tablet 130 with a finger or stylus 140; move the tip of stylus 140 on the touch and pressure sensitive surface of tablet 130; and so on. Tablet 130 is configured to detect the various manipulations performed by the user with stylus 140 and/or with a finger, knuckle, etc. on the surface of tablet 130 and communicate information regarding the manipulations to tablet/stylus input module 122 on computer device 100, for example via a wired or wireless interface.

Tablet/stylus input module 122 may be implemented as a component or module of application 120, as a library function, as a driver, or as some other software entity. Tablet/stylus input module 122 may be implemented in software, in hardware, or as a combination of hardware and software. Graphics application 120, via tablet/stylus input module 122, may interpret the information regarding the manipulations to detect various gestures and to perform various painting actions in response to the detected gestures for creating or editing content of image 126. For at least some of those actions, painting tool 128 may be appropriately moved, modified, and/or otherwise affected on display 102. Various examples of gestures that may be detected are listed below, as are various examples of painting actions that may be invoked and/or controlled by such stylus gestures.

In some embodiments, software and/or hardware on tablet 130 may perform at least some of the functionality of detecting various gestures. Thus, in some embodiments, tablet 130 may be configured to detect gestures and communicate the detected gestures to graphics application 120, which then performs the appropriate painting actions in response to the gestures. In other embodiments, tablet 130 may only collect information regarding gestures and communicate the gestures to application 120 via tablet/stylus input module 122; tablet/stylus input module 122 may perform the function of detecting the gestures from the information and communicating the gestures to application 120, or to other modules of application 120, which then performs the appropriate painting actions in response to the gestures.

In various embodiments, graphics application 120 may include a bristle-based brush model 123, in which the brush consists of a set of bristles that dynamically change shape in response to the physics of the brush stroke (causing a change in the mark left by the brush). In contrast, a single (statically shaped) two-dimensional (2D) grayscale stamp is typically used by conventional digital painting programs.

In some embodiments, graphics application 120 (e.g., in the painting simulation module 127) may include support for "wet" and/or "dirty" paint, i.e., support for bidirectional paint transfer (e.g., from the brush to the canvas, and from the canvas to the brush), which enables color blending and smudging in a way that mimics natural paint media. Such bidirectional paint transfer is in contrast to a unidirectional paint transfer (e.g., the transfer of paint from brush to canvas only, without dirtying the brush) that is typically used in conventional digital painting programs.

In some embodiments, graphics application 120 (e.g., in the painting simulation module 127) may simulate watercolor painting, and create the effects of a brush wet with watery paint that slowly dries during a stroke. Conventional paint programs typically do not simulate these secondary effects, although some may use additional tools and textures to create similar results.

Figure 2:
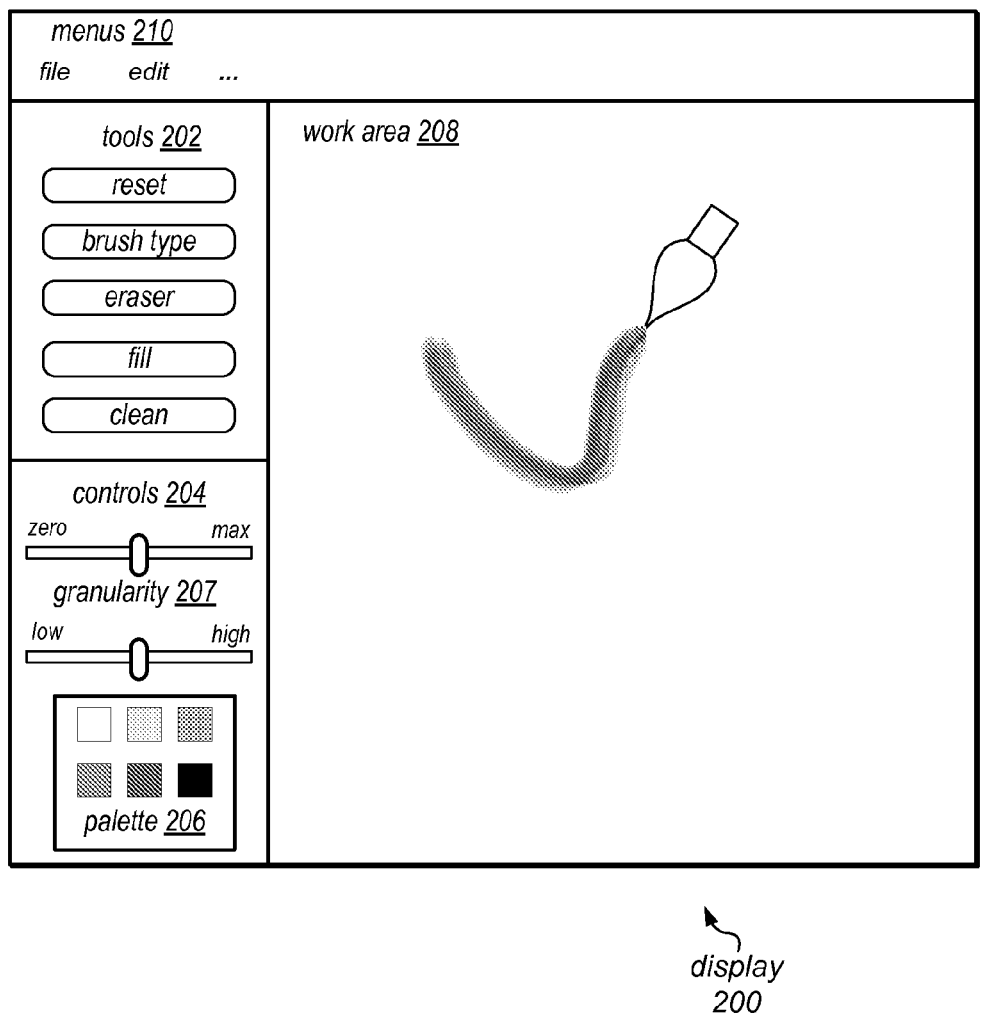
FIG. 2 is a block diagram illustrating a display on which a user interface to a graphics application may be implemented, according to some embodiments.

FIG. 2 illustrates an example display 200 on which a user interface to a graphics editing module, such as image editing operations module of graphics application 120 may be implemented, according to one embodiment. In this example, the display is divided into four regions or areas: menus 210, tools 202 (which may include a "fill" tool, a "clean" tool, and/or a brush type selection tool), controls 204 (which may include palette 206 and granularity parameter selection tool 207), and work area 208. Tools 202 may include one or more user-selectable user interface elements. In this example, it is this area that contains the user interface elements that a user may select to apply various effects to the image. For example, the user may select a type of brush tool (using the brush type selection tool) for use in applying paint to an image being created and/or edited in work area 208. Other optional tools may be selected as well, such as an eraser or reset function, in some embodiments.

While FIG. 2 shows many of the elements in tools area 202 as buttons, other types of user interface elements, such as pop-up or pull-down menus, may be used to select from among one or more tools in various embodiments. For example, in one embodiment, the brush type selection mechanism illustrated in tools area 202 may be implemented using a pop-up or pull-down menu to select a brush type, such as a paintbrush, pencil, charcoal, crayon, oil pastel, eraser, airbrush, spray can, and so on. As noted above, the reset and eraser tools are optional, and thus may or may not be included on the user interface in various embodiments. Various embodiments may include other tools not shown as well, such as an "undo" tool that undoes the most recent user action in the work area 208.

In this example, controls 204 may include one or more user-modifiable controls, such as slider bars, dials, pop-up menus, alphanumeric text entry boxes, etc., for specifying various parameters of the painting functions to be applied to an image (e.g., using the brush tool). In this example, two slider bars are provided to specify different values (or relative values) of configurable parameters of a painting function, one of which is usable to specify a distortion amount (205). In various embodiments, slider bars may also be used to specify values of other configurable parameters, such as an amount of ink, a pigment concentration amount, a transparency value, a brush width, a bristle stiffness, a "hardness" (e.g., which indicates whether the mark made by a brush or an erodible mark making tool is constant or falls off according to a corresponding distribution model), a cutoff angle, a particle count (specifying, for example, the number of individual particles of paint to be emitted at each airbrush step, e.g., in each instantaneous "burst" from a virtual airbrush tool to make a mark during a stroke), a minimum particle size, a maximum particle size, a maximum granularity value, or other parameters that are to be applied when using the brush tool to "paint" or "draw" on the image being created or edited in work area 208. Various methods of specifying values of any of the other parameters used in simulating painting effects (i.e. methods other than those illustrated in FIG. 2) may be used in other embodiments. In some embodiments, slider bars or another input mechanism in controls area 204 may be used to specify one or more threshold distance values for use with proximity based gestures and their corresponding functions in the graphics application, or a deposition threshold amount. In some embodiments, slider bars or another input mechanism in controls area 204 may be used to specify a zoom level for an automated zoom function or to override a default zoom level for such a function.

In the example illustrated in FIG. 2, menus 206 may include one or more menus, for example menus used to navigate to other displays in the graphics application, open files, print or save files, undo/redo actions, and so on. In this example, work area 208 is the area in which an image being created or edited is displayed as graphics editing operations are performed. In various embodiments, work area 208 may display a portion or all of a new image to which paint or other natural media is to be added, or a portion or all of a previously existing image being modified by adding paint, as described herein. In the example illustrated in FIG. 2, work area 208 of FIG. 2 illustrates an image in progress.

Some embodiments of a painting simulation module, such as painting simulation module 127 described herein, may employ a brush model (such as brush module 123) that simulates a brush tip and the notion of the paint being held in the brush tip and deposited on a canvas during strokes. In some embodiments, during the act of stroking with the brush, the brush's paint load will be depleted, eventually running out, and the brush may dirty, picking up paint from the canvas, as with a real brush. Clean and fill actions may be provided to allow the user to manage the paint load between strokes for the desired stroke effect. The user interface illustrated in FIG. 2 also includes a color palette whereby a user may manually load a brush with paint if and when desired, and a "fill" user interface element (shown as a radio button) whereby a user may enable or disable an auto fill option.

Following advances such as support for dynamic bristle brush tip simulations, digital artists have come expect more sophisticated tools in their painting applications. As previously noted, while airbrush tools exist in some digital painting applications, they generally lack the expressive qualities of a real artist's paintbrush, including the texture of strokes and the response to changes in how the tool is held. In some embodiments, a graphics application or image editing application (e.g., a natural media painting application) may include a physically-inspired airbrush tool that uses a particle model to create a variable granular quality. The virtual airbrush tool may also take advantage of the 6DOF input that can be obtained from an advanced tablet stylus to achieve the same variations in shape due to the virtual brush pose that can be created by corresponding manipulations of real-world airbrush mechanisms.

Figure 3:
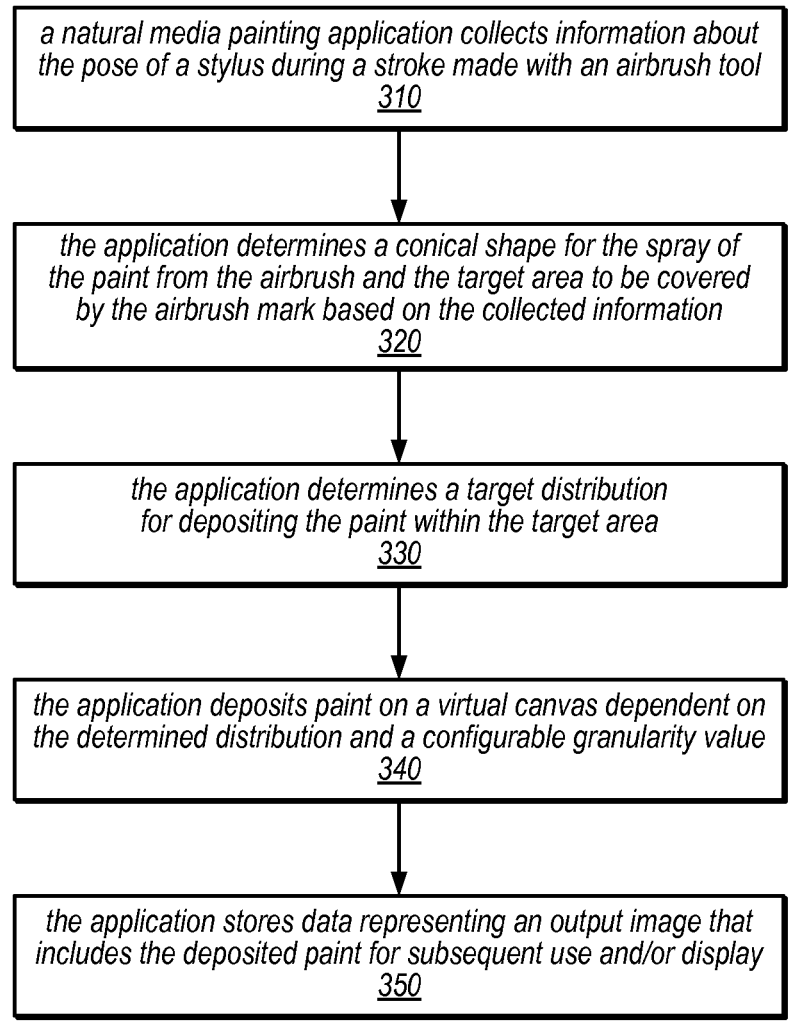
FIG. 3 is a flow diagram illustrating one embodiment of a method for creating a mark with a virtual airbrush tool.

One embodiment of a method for creating a mark with a virtual airbrush tool is illustrated in FIG. 3. As illustrated in this example, the method may include a natural media painting application collecting information about the pose of a stylus during a stroke made with an airbrush tool (as in 310). In some embodiments, collecting information about the pose of the stylus may include collecting 6DOF information from the stylus, as described in more detail below. As illustrated in this example and described in more detail below, the method may include the application determining a conical shape for the spray of the paint from the airbrush and the target area to be covered by the airbrush mark based on the collected information (as in 320).

The method may also include the application determining a target distribution for depositing the paint within the target area (as in 330). In some embodiments, the target distribution may be dependent on the value of a configurable hardness parameter. The method may also include the application depositing paint on a virtual canvas dependent on the determined distribution and, in some embodiments, the value of a configurable granularity parameter (as in 340). As illustrated in this example, the method may then include the application storing data representing an output image that includes the deposited paint for subsequent use (e.g., in a subsequent editing operation) and/or display (as in 350).

Figure 4:
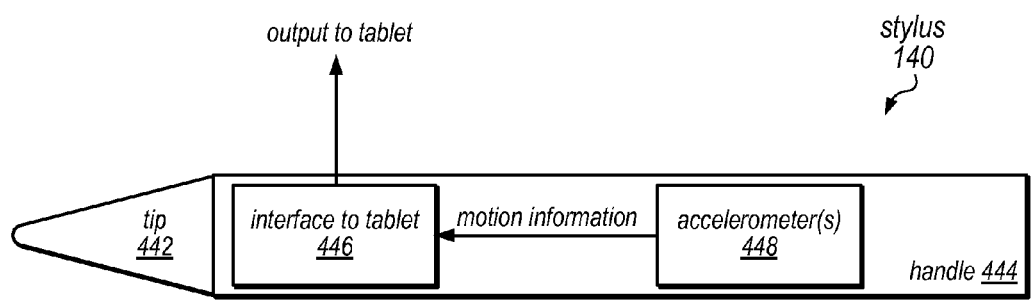
FIG. 4 illustrates various components of an example stylus, according to some embodiments.

FIG. 4 illustrates components of an example stylus 140 according to some embodiments. Stylus 140 may generally be described as having a tip 442 and a handle 444. Note that a stylus 140 may be provided with two tips instead of one as shown in FIG. 4. Stylus 140 may include one or more accelerometers 448 and/or other components for sensing movement metrics including but not limited to spatial (location), directional, and acceleration metrics. This motion information may be communicated to a tablet, such as tablet 130 shown in FIGS. 1 and 2, via an interface 446. Interface 446 may typically be a wireless interface, although wired interfaces are possible.

In some embodiments, the natural media painting application may employ a brush model that simulates the use of a brush, such as one represented by a brush tool that is manipulated using a stylus. In such embodiments, realistic brush behavior may be simulated in the painting application. In one embodiment, the brush behavior may be simulated substantially in real-time to deposit ink or paint onto a virtual canvas. In some embodiments, a brush model may include a large set of discrete bristles. The bristles may comprise "virtual" bristles and may also be referred to as bristle representations. The simulated behavior of the brush may result in continuous strokes created by sweeping individual bristles into quadrilaterals. The brush model and brush behavior simulation may model the change of the shape of a brush tip during a stroking motion and the deposition of paint or ink resulting from the motion. In some embodiments, by computing the effect of each bristle independently of other bristles, a faithful reproduction of how a real brush deposits paint or ink and changes shape during a stroke may be achieved.

Stylus gestures that may be detected by a natural media painting application in various embodiments may include, but are not limited to: a translation in one or more dimensions, a barrel rotation (e.g., a twisting motion about the major axis of the stylus), a fanning motion (e.g., waving the stylus tip back and forth above the tablet), mashing down (e.g., pressing the stylus into the tablet with high pressure), a jerk up (e.g., a quick motion away from the tablet), a jerk down (e.g., a quick motion toward the tablet), shaking away from the tablet (e.g., holding the stylus by its end and flicking the wrist), and/or shaking toward the tablet (e.g., holding the stylus by its end and flicking the wrist in the opposite direction). At least some of the stylus gestures that may be detected may be performed using a stylus that has been augmented with one or more accelerometers, and possibly other hardware and/or software, for collecting motion data and/or other data to be used in gesture recognition.

Figure 5A:
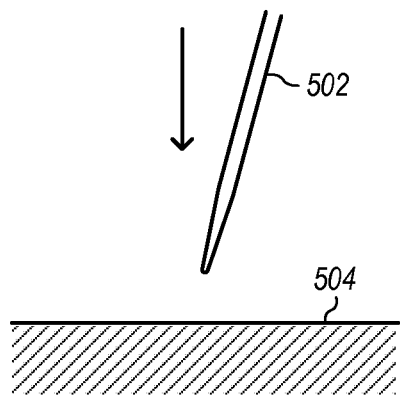
FIGS. 5A-5D illustrate various stylus poses and gestures that may be recognized by an interface module of a natural media painting application, according to various embodiments.
Figure 5B:
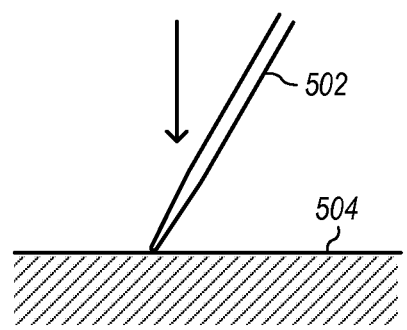
Figure 5C:
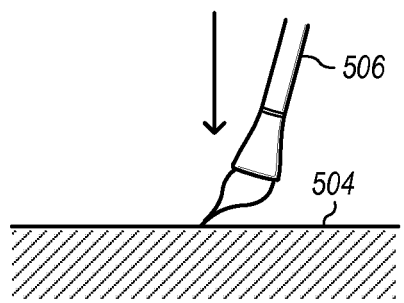
Figure 5D:
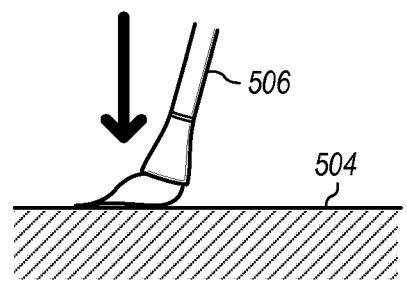
Figure 6A:
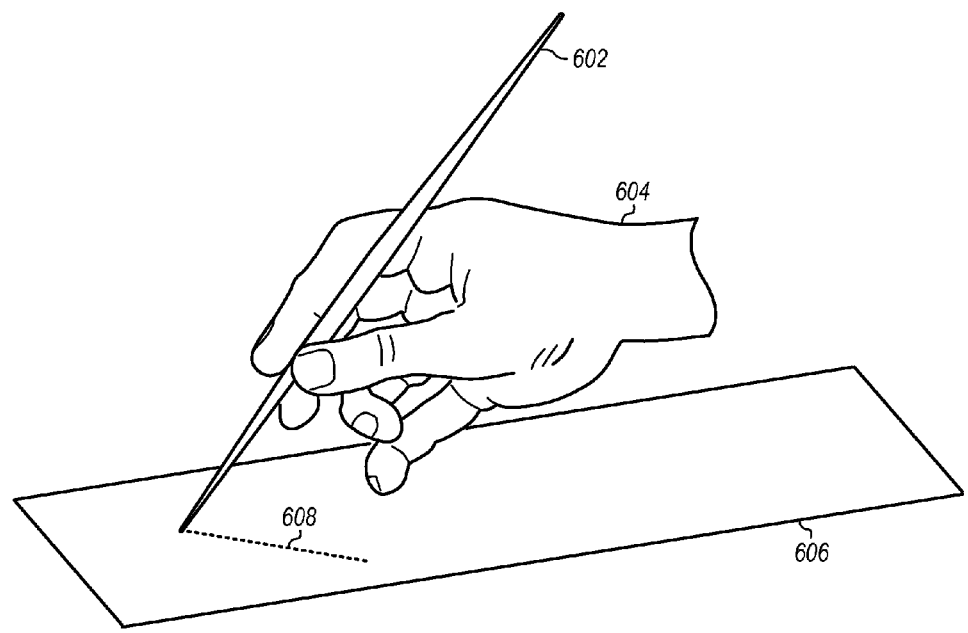
FIGS. 6A-6B illustrate examples of various stylus poses during strokes made on a tablet, according to some embodiments.
Figure 6B:
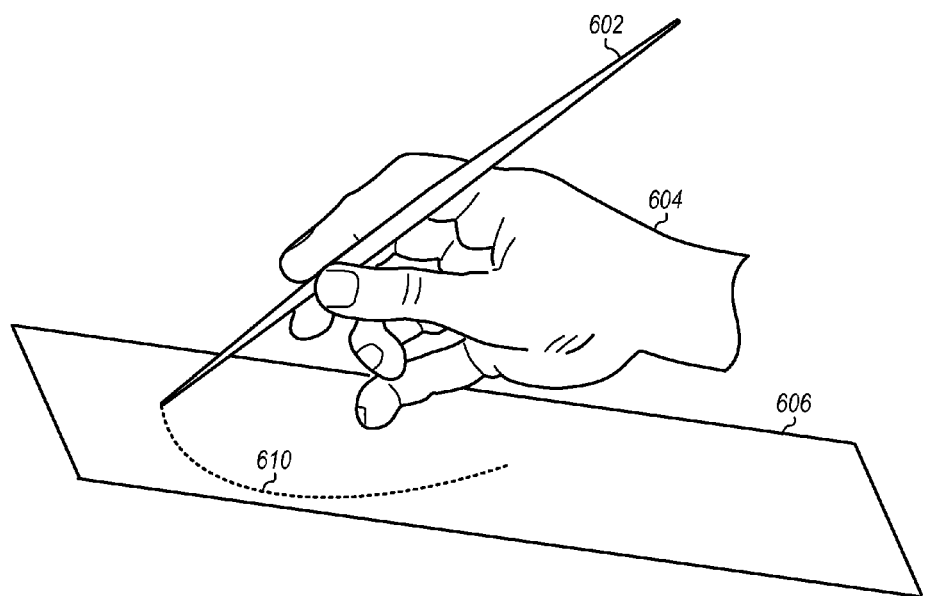

In some embodiments, a natural media painting application may detect and recognize various stylus poses, and the pressure with which a stylus touches a tablet, and these inputs may be used to create and control various painting/drawing effects, such as those described herein. Some of the stylus poses and actions that may be recognized by an interface module of a natural media painting application, such as tablet/stylus input module 122 in FIG. 1, are illustrated in FIGS. 5A-5D, according to various embodiments. For example, FIG. 5A illustrates a stylus 502 which is in proximity to and being moved toward a virtual canvas 504 and that is being held at an angle of less than 45°. FIG. 5B illustrates a stylus 502 that is being pressed into a virtual canvas 504 and that is being held at an angle greater than 45°. 5C and 5D illustrate the effects of different stylus gestures on a brush model. For example, FIG. 5C illustrates the effect of a stylus gesture that corresponds to pressing a bristle brush 506 lightly on a virtual canvas 504, while FIG. 5D illustrates the effect of a stylus gesture that corresponds to mashing a bristle brush 506 down into a virtual canvas 504. In general, tablet/stylus input module 122 may be configured to recognize a wide variety of stylus poses and gestures by detecting manipulation of the stylus from an initial pose (e.g., an initial position and orientation) using six degrees of freedom (e.g., detecting movement in a given direction in three dimensions, rotation about an axis in any dimension, pitch, roll, yaw, etc.) As described herein, this 6DOF information may be augmented with information collected from an accelerometer, various proximity sensors, a touch and/or pressure sensitive tablet device, or other input mechanisms to define a stylus gesture that is mapped to an action to be taken in a natural media painting application, and the action mapped to the gesture may be dependent on a work mode and/or context in which the stylus gesture was made. Similarly, FIGS. 6A and 6B illustrate a user 604 holding a stylus 602 in different poses while making different painting/drawing strokes (i.e., strokes 608 and 610, respectively) on a tablet device 606 (i.e., a virtual canvas).

As previously noted, real-world airbrushes work by dissolving pigment in a liquid medium and then spraying the solution through a nozzle with pressurized air. The physics of this mechanism can be used to create a variety of painting effects which artists have then used to create a wide variety of artistic styles. For example, the spray of paint from a real-world airbrush is typically conical in shape. Depending on the settings, the distribution of pigment in the cone may be uniform, or it may be concentrated near the center. Because of this geometry, the types of shapes that can be created by adjusting the tilt of the real-world airbrush with respect to the canvas vary in particular ways. More specifically, these shapes are the class of "conics", i.e., the set of shapes defined by the intersection of a plane with a cone. In addition, the amount of pigment deposited per canvas area changes as a real-world airbrush is held closer to or farther from the canvas. Furthermore, as pigment is sprayed at a constant rate, the amount of pigment deposited on the canvas per inch depends on the velocity at which a real-world airbrush is moved. Finally, with real-world airbrushes, the pigment particles can vary in size, so that when they are sprayed on the canvas, they may make a fine mist with uniform appearance, or they may include fewer, larger blobs that make discrete splats on the canvas. Typically, airbrush artists want to make smooth strokes. Therefore, they generally attempt to achieve very fine pigment particles. However, the spatter effects from real-world airbrushes can be useful for creating many different types of texture.

In some embodiments, a graphics application or image editing application (e.g., a natural media painting application) may implement a virtual airbrush tool that incorporates a variety of components, as described in more detail below. In various embodiments, these components may individually or collectively control the mappings between inputs to the virtual airbrush tool and its outputs, various parameters that affect performance of the airbrush tool and/or a natural media painting application that provides such a tool, the generation of random particles to create a desired final output stroke, and/or the combination of random particles with a projected texture for faster creation of smooth strokes.

In some embodiments, six degree of freedom (6DOF) input from a tablet/stylus input module may be mapped directly to the pose of a virtual airbrush tool. For example, in some embodiments, this input may include the x and y coordinates of the stylus tip, the pressure exerted by the stylus on the tablet, the tilt of the stylus in the x dimension (or azimuth), the tilt of the stylus in the y dimension (or altitude), and the rotation of the stylus, which may be mapped to the x and y coordinates of the virtual airbrush, the height of the virtual airbrush above the canvas, the tilt of the virtual airbrush in the x dimension (sometimes referred to herein as "tilt-x"), the tilt of the virtual airbrush in the y dimension (sometimes referred to herein as "tilt-y"), and the rotation of the virtual airbrush, respectively. In some embodiments, the virtual airbrush may be modeled as a piece of three-dimensional (3D) geometry in the shape of a cone attached to a handle, where the cone-shaped 3D geometry represents the paint spray. In some embodiments, a user may be able to adjust the cutoff angle θ, which in turn may change the size and/or shape of the cone. As noted above, in some embodiments pressure (i.e., the pressure of the stylus on the tablet) may control the height of the virtual airbrush tool above the virtual canvas, within a pre-defined range of heights. For example, when pressure=1, the virtual airbrush tool may be considered to be held at the minimum distance above the virtual canvas, and when pressure=0, the virtual airbrush tool may be considered to be held at the maximum distance above the virtual canvas. In this example, pressure values between zero and one may be mapped to respective distances between the minimum and maximum distances above the virtual canvas (e.g., using any linear or non-linear interpolation technique).

Figure 7A:
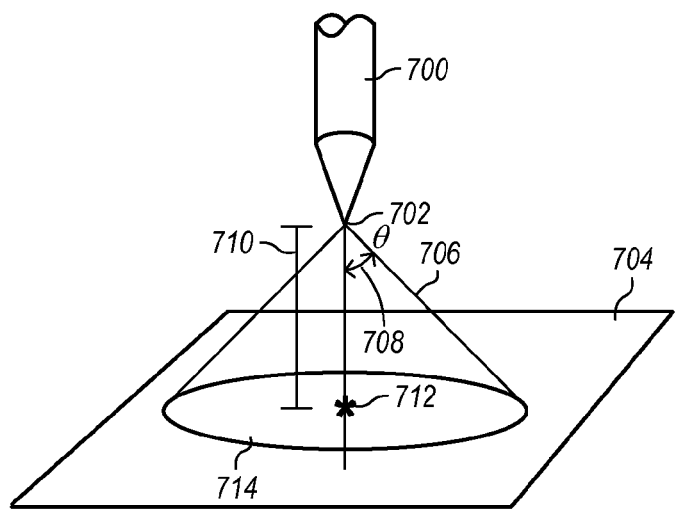
FIGS. 7A-7F illustrate the use of a projection-based virtual airbrush tool, according to some embodiments.
Figure 7B:
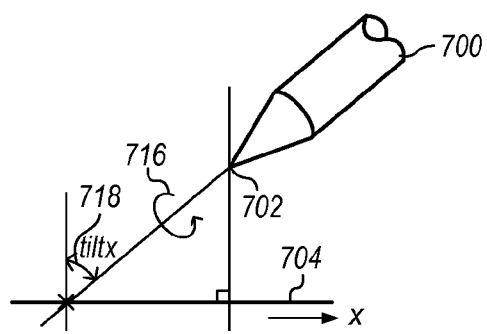

FIGS. 7A-7F illustrate the use of a projection-based virtual airbrush tool, according to some embodiments. For example, in FIG. 7A (which is an isometric view), a height measurement 710 is shown as the distance from the tip (702) of the airbrush tool 700 (i.e., the stylus) to the virtual canvas 704 (i.e., a tablet), the cutoff angle 708 is labeled as θ, and the "*" (labeled 712) marks the (x,y) position of the airbrush tool 700 (i.e., the stylus) on the virtual canvas 704 (i.e., the tablet). In this example, the cone of projection from the airbrush tool 700 is shown as 706, and the target area on the virtual canvas 704 (i.e., the area defined by the intersection of the cone with the canvas) is shown as 714. FIG. 7B illustrates a side view in which the tilt in the x direction (sometimes referred to herein as "tilt-x") is labeled as 718, the rotation is indicated as a circular motion labeled as 716, the location of the height is shown as a line segment that is perpendicular to the virtual canvas 704 and runs from the tip 702 of the airbrush 700 to its intersection with virtual canvas 704.

Figure 7C:
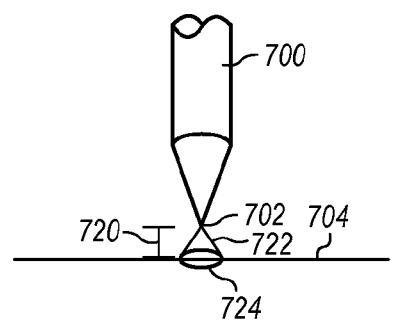
Figure 7D:
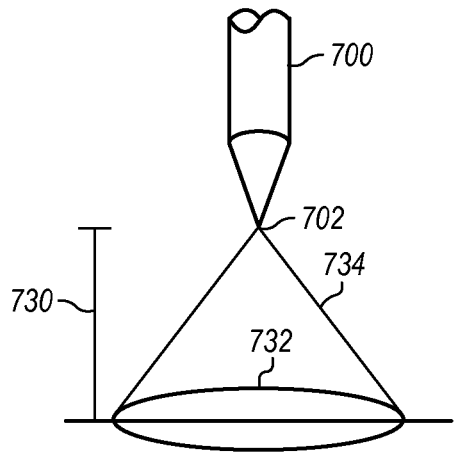
Figure 7E:
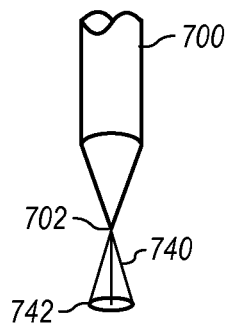
Figure 7F:
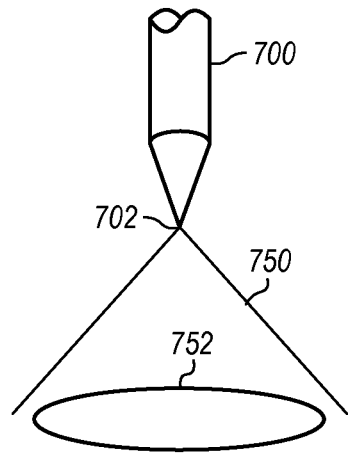

FIG. 7C illustrates an example in which the tip 702 of airbrush tool 700 is in contact with the virtual canvas 704 with maximum pressure (e.g., pressure=1) and at the minimum height (shown as 720). In this example, the cone of projection is shown as 722, and the resulting target area is shown as 724. FIG. 7D illustrates an example in which the tip 702 of airbrush tool 700 is in contact with a canvas with no pressure and at the maximum height (shown as 730). In this example, the cone of projection is shown as 734, and the resulting target area is shown as 732. FIG. 7E illustrates an example in which a small cutoff angle has been defined for the airbrush tool 700. In this example, the cone of projection from tip 702 is shown as 740, and the resulting target area is shown as 742. FIG. 7F illustrates an example with a large cutoff angle. In this example, the cone of projection from tip 702 is shown as 750 (and is much larger than in the example illustrated in FIG. 7E), and the resulting target area is shown as 752.

Figure 8A:
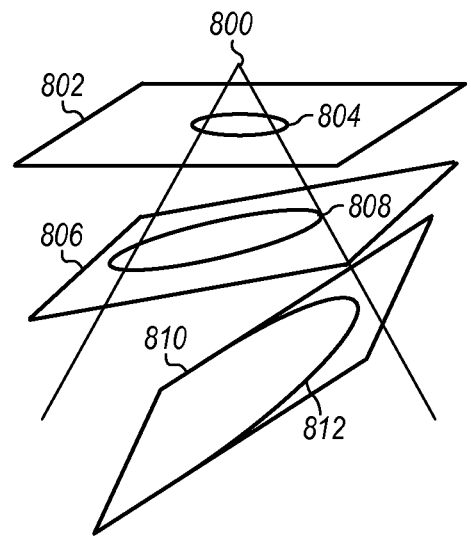
FIGS. 8A-8E illustrate different conic shapes for various virtual airbrush marks, according to some embodiments.
Figure 8B:
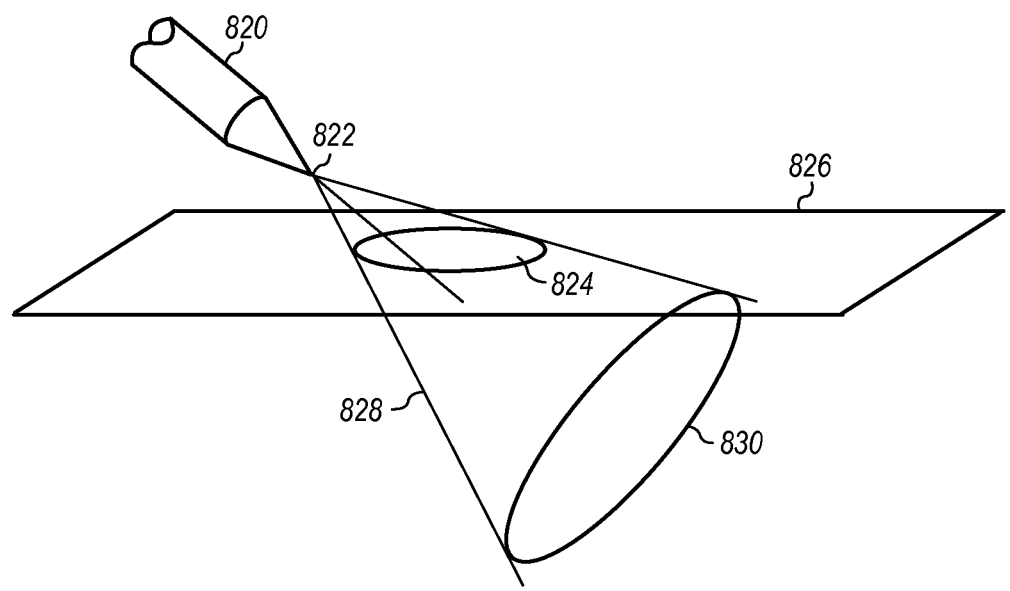
Figure 8C:
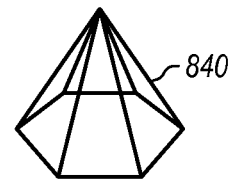
Figure 8D:
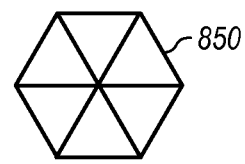
Figure 8E:
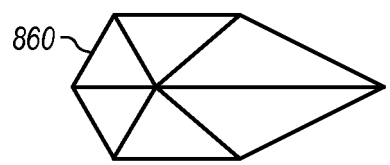

In some embodiments, to create a mark on the canvas, the vertices of the 3D cone-shaped geometry may be projected onto the canvas plane and then rendered. This may create the characteristic shapes (e.g., circles, ellipses, parabolas) of a real-world airbrush mark. FIGS. 8A-8E illustrate different conic shapes for various virtual airbrush marks, according to some embodiments. For example, FIG. 8A illustrates conic sections of a projection from tip 800 as a circle 804 (in the top cross-section 802), ellipse 808 (in the middle cross-section 806) and parabola 812 (in the bottom cross-section 810). FIG. 8B illustrates the conic shape of a mark on a virtual canvas 826 (i.e., the ellipse 824) defined by the intersection of the cone of projection 828 for a circle 830 from the tip 822 of airbrush tool 820. FIG. 8C illustrates a polygonal cone 840 with n=6. FIG. 8D illustrates the polygonal cone of 8C when flattened (e.g., a vertical projection 850). FIG. 8E illustrates the polygonal cone of 8C when elongated a non-vertical projection (shown as 860).

In some embodiments, in order to create the effect of different pigment concentration falloffs (the distribution of pigment along the radius of the cone), the cone geometry may have a texture map applied to it, and this texture map may map into a pre-rendered falloff texture. In some embodiments, the falloff may be defined by the following function:

$$y(x) = \begin{cases} 1 & x \leq h \\ g\left(\frac{x-h}{1-h}\right) & h < x < 1 \\ 0 & x \geq 1 \end{cases} \quad (1)$$

where, $$g(x) = \frac{1}{\sigma^2 \sqrt{2\pi}} e^{-\frac{x^2}{2\sigma^2}} \quad (2)$$

In this example, x may represent the radial distance from the center of the projected cone, normalized such that x=1 is at the perimeter of the projected cone. Note that in some cases, the value of x may be greater than one. For example, if the texture being projected is a square and it is being projected within a circular target area, for any portions of the square that are outside the circle, the radial distance from the center of the cone would be greater than 1. In this example, y(x) may represent the output paint distribution; g(x) may represent the Gaussian function centered at 0 with $\sigma^2$=0.15; and h may represent a "hardness" parameter value (which may be user-configurable) that may support hardness values varying from h=1 (where the distribution of paint may be constant across the projected cone) to h=0 (where the distribution/falloff may be completely Gaussian).

Figure 9A:
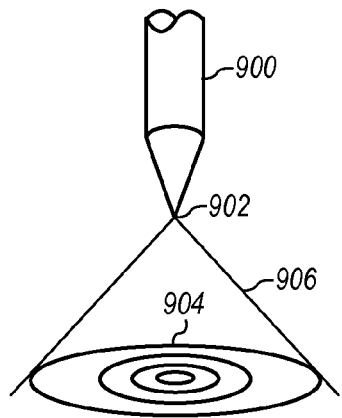
FIGS. 9A-9H illustrate relationships between Gaussian falloff and hardness, according to some embodiments.
Figure 9B:
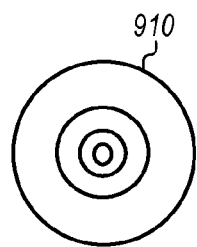

FIGS. 9A-9H illustrate relationships between Gaussian falloff and hardness when creating an airbrush mark, according to some embodiments. For example, FIG. 9A illustrates a side view of the application of a texture map by an airbrush tool 900. In this example, the cone of projection from tip 902 is illustrated as 906, and the mark made by the projection of the texture map is shown as 905. FIG. 9B illustrates a top view of the texture map 910 that was applied in FIG. 9A.

Figure 9C:
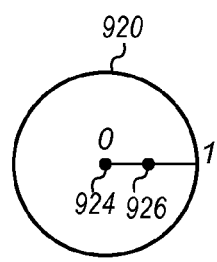
Figure 9D:
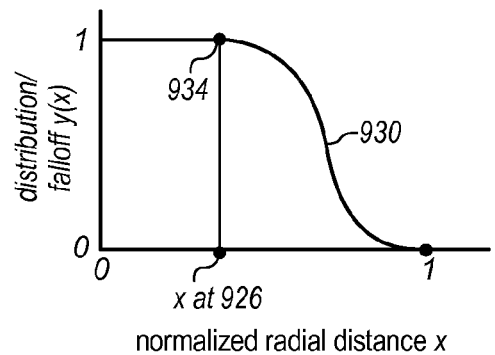

As described above, for a given mark made by an airbrush tool, the shape of the falloff function in terms of the radial distance given by x (e.g., a Gaussian falloff function) may correspond to a particular hardness value "h", such that the falloff is zero up to a given radial distance that is based on the hardness value. FIG. 9C illustrates an example in which the normalized radial distance within a target mark area 920 (i.e., its distance from the center, which is labeled as 924) for a particular value of "x" labeled at 926 is the distance between 924 and 926. FIG. 9D illustrates a target paint distribution 930 corresponding to FIG. 9C as a falloff function y(x) in which the falloff value in terms of the normalized radial distance x, is represented by a Gaussian function whose shape is dependent on the particular hardness value h. In this example, the paint distribution between a normalized radial distance of 0 and the normalized radial distance at point 934 is shown as constant. In this example, the paint distribution 930 begins to drop off after point 934, which corresponds to the normalized radial distance at point 926 in FIG. 9C. As noted above, the point at which the paint distribution 930 begins falling off (which is sometimes referred to as the "constant point") is dependent on the hardness value h.

Figure 9E:
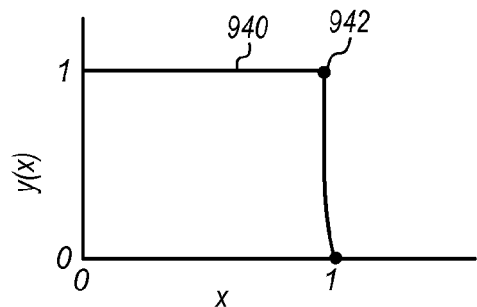
Figure 9F:
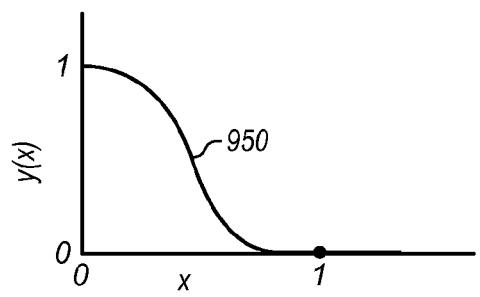
Figure 9G:
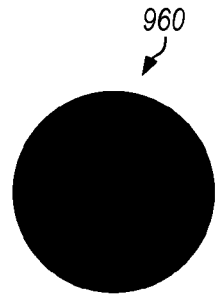
Figure 9H:
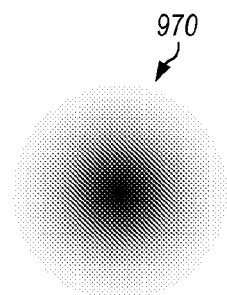

FIG. 9E illustrates a paint distribution 940 in which the hardness value h=1 as a Gaussian function y(x) with little or no falloff. In this example, the paint distribution is essentially constant across the entire range of values for the normalized radial distance (e.g., from 0 to 1), with a sharp inflection point (942) at the maximum normalized radial distance of 1. By contrast, FIG. 9F illustrates a paint distribution 950 in which the hardness value h=0 as a Gaussian function y(x) with little or no constant region before the falloff begins. FIG. 9G illustrates an airbrush mark 960 resulting from the paint distribution shown in FIG. 9E (i.e., when the hardness value h=1). FIG. 9H illustrates an airbrush mark 970 resulting from the paint distribution shown in FIG. 9F (i.e., when the hardness value h=0).

In some embodiments, to create the effect of constant paint flow rate per unit time, the amount of paint applied may be varied with velocity of the airbrush. In such embodiments, as the virtual airbrush tool moves faster across the virtual canvas, the mark made may become lighter, and as the virtual airbrush tool moves more slowly across the virtual canvas, the mark may become darker.

Figure 10:
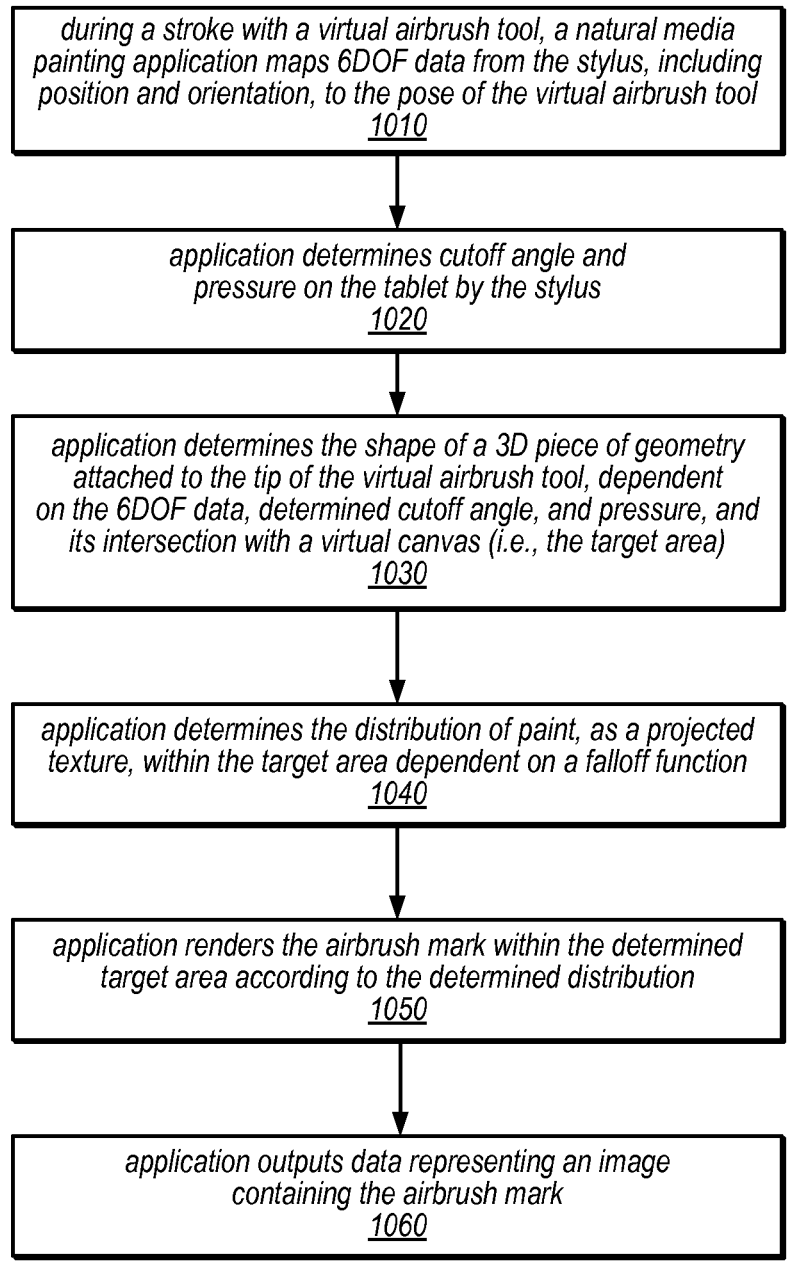
FIG. 10 is a flow diagram illustrating one embodiment of a method for creating a mark with a virtual airbrush tool using projection in a natural media painting application.

One embodiment of a method for creating a mark with a virtual airbrush tool using projection in a natural media painting application is illustrated by the flow diagram in FIG. 10. As illustrated in this example, the method may include, during a stroke with a virtual airbrush tool, a natural media painting application mapping 6DOF data from the stylus, including position and orientation, to the pose of the virtual airbrush tool (as in 1010). The method may also include the application determining a cutoff angle and the pressure exerted on the tablet by the stylus (as in 1020). In some embodiments, the cutoff angle may be configurable by the user and may affect the conical shape with which the paint spray from the virtual airbrush tool will be modeled (e.g., it may affect the size of the cone). In some embodiments, the pressure may be mapped to the height of the virtual airbrush tool.

As illustrated in this example, the method may include the application determining the shape of a 3D piece of geometry attached to the tip of the virtual airbrush tool, dependent on the 6DOF data, the determined cutoff angle, and the pressure (as in 1030). This 3D piece of geometry may define the conical shape with which the paint spray is modeled (as described above and as in element 320 of FIG. 3). In this example, the intersection of that 3D piece of geometry with a virtual canvas may define the target area for the airbrush mark.

As illustrated in this example, the method may include the application determining the distribution of paint, as a projected texture, within the determined target area dependent on a falloff function (as in 1040). As described herein, in some embodiments, the falloff function may be dependent on the value of a configurable hardness parameter. The method may also include the application rendering the airbrush mark within the determined target area according to the determined distribution (as in 1050), and the application outputting data representing an image that contains the airbrush mark (as in 1060), e.g., for storage or for subsequent use (e.g., in a subsequent editing operation) and/or display by the natural media painting application or another application.

In some embodiments, to create granular effects of pigment spatter such as those created by real-world airbrushes, the application may cause the airbrush to "shoot" (i.e., emit) a large number of individual particles at the canvas (e.g., creating a mark on the canvas by emitting a "burst" of individual paint particles), rather than to deposit paint as if it were projected within a single cone. The cumulative effect of depositing a large number of very small paint particles on a virtual canvas may be the same as that achieved when depositing paint on the virtual canvas by projecting a texture in a single cone (e.g., it may create a mark with a nice smooth appearance), but the particle-based approach may in some cases be much more expensive to compute than a projection-based approach. However, for smaller numbers of particles, the resulting noisy effect may in some cases be desirable. In some embodiments, per airbrush step, the application may create new particles with random velocity (i.e., particles in which the direction of the velocity is random) and may emit them from the airbrush nozzle such that the distribution of the individual particles over time is the same as the falloff described above. In other words, the application may model the behavior of an airbrush tool by modeling where each of number of individual paint particles collides with a virtual canvas. In some embodiments, this approach may include generating two random numbers, the altitude $\phi$ and azimuth $\psi$, which may be used to compute the trajectory for each particle, as described below. When emitted by the virtual airbrush tool, each particle may intersect with the canvas according to its computed trajectory, and a splat corresponding to an individual paint particle (e.g., a small square texture mapped with a Gaussian falloff) may be drawn at the intersection point.

In some embodiments, to compute $\psi$ (the azimuth), a uniform random number u may be generated in the range [0, 360). On the other hand, computing $\phi$ (the altitude) such that the result is in the desired falloff distribution (i.e., to compute a random variable having an arbitrary distribution) may be more difficult. In some embodiments, computing $\phi$ (the altitude) may include converting the falloff function y(x) to a probability distribution function (PDF), y'(x). In some embodiments, for each value x, the probability that the particle is projected at that angle is y'(x). Therefore, y'(x) must be normalized so that its integral sums to 1, as follows:

$$\int_0^1 y'(x)dx = 1.$$

Therefore, if $$\int_0^1 y(x)dx = s \text{ then } y'(x) = \frac{1}{s}y(x).$$

Then from the PDF, the cumulative distribution function (CDF) may be computed as follows:

$$c(x) = \int_0^x y'(x)dx.$$

In some embodiments, for each x, c(x) may represent the probability that a random variable with the distribution will have value less than x. The CDF may then be used to compute the inverse cumulative distribution function (ICDF), or quantile function, as follows:

$$q(y)=\{x|c(x)=y\}.$$

In this example, q(y) may be the value of x that represents the $y^{th}$ percentile of the PDF. In other words, q(0.5) would be the median of the PDF, and q(0.95) would be the 95th percentile, in this example. In some embodiments, the ICDF may be used to transform a uniform random variable u in the range [0,1] into a random variable with the distribution of the corresponding PDF, by x=q(u). Given the ICDF and uniform random variable u in the range [0, 1], φ may be computed as follows:

$$\phi = \tan^{-1}(\sqrt{q(u)}\tan(\psi)) \quad (3)$$

As previously noted, in some embodiments, the individual particles emitted by the virtual airbrush tool when making a mark on a virtual canvas (i.e., during a single "burst") may be of different sizes (e.g., in a range bounded by a minimum particle size and a maximum particle size). For example, in some such embodiments, the size of each particle (s) may be computed as $s=u^2$ from a uniform random variable u in the range [min, max]. In some embodiments, using a squared uniform random variable to determine the distribution of particle sizes rather than a uniform distribution may yield a more pleasing and/or "correct" appearance (e.g., more like the effect produced by a real-world airbrush). For example, a distribution based on a squared random variable would include a larger number of small particles than large particles (with many small particles visible in the resulting mark), while a uniform distribution would include the same number of large and small particles (with the large particles dominating the resulting mark).

In some embodiments, the target area to be covered by the airbrush mark may be computed dependent on the cutoff angle and the pose of the virtual airbrush tool above the virtual canvas. In such embodiments, the application may be configured to emit individual paint particles from the virtual airbrush tool until the same amount of area has been covered. This may be done by computing the area per-particle (based on the size s of each particle) and continuing to emit particles until the accumulated area of all particles emitted exceeds the target mark area.

In some embodiments, the number of particles that should be emitted to create an airbrush mark may be computed dependent on the area of the target airbrush mark and the flow rate of the brush. In cases in which the flow rate per mark is reduced (e.g., due to a combination of a constant flow rate per time and a fast moving stroke), the number of paint particles emitted per mark may be correspondingly reduced, rather than reducing the darkness of the same number of splats, as in other painting applications. Furthermore, in some embodiments, the user may be able to manually adjust the number of individual paint particles to emit per mark (e.g., by setting or changing the value of a configurable particle count parameter), in order to create reduced flow effects. For example, in one embodiment, a default value of a configurable particle count parameter may be 100, indicating that for an individual mark made by the virtual airbrush tool (e.g., as a stand-alone mark or as part of a longer stroke), the airbrush tool may emit 100 individual paint particles having a distribution of sizes and velocity directions such that the cumulative effect of the deposition of the individual paint particles meets a target distribution for the airbrush mark (based on the pose of the virtual airbrush tool, a specified flow rate, a specified hardness value, and/or other parameters). In some embodiments, the user may adjust the value of the particle count parameter (and/or other parameters) to achieve different airbrushing effects.

Figure 11A:
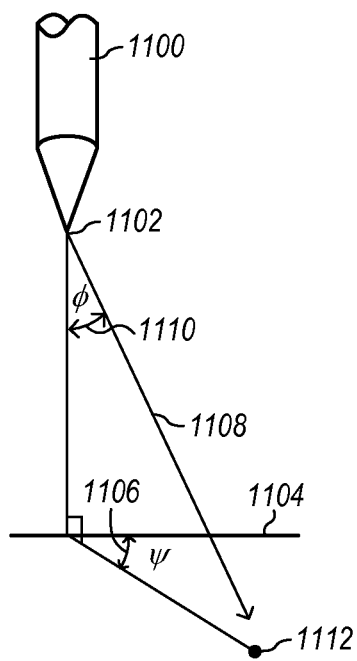
FIGS. 11A-11D illustrate a computation of particle trajectory according to different falloff function components, according to some embodiments.
Figure 11B:
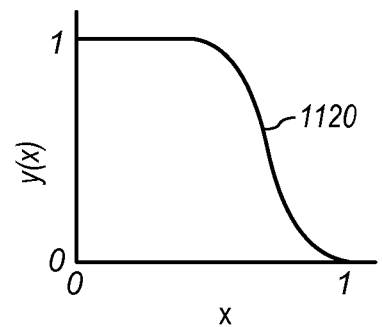
Figure 11C:
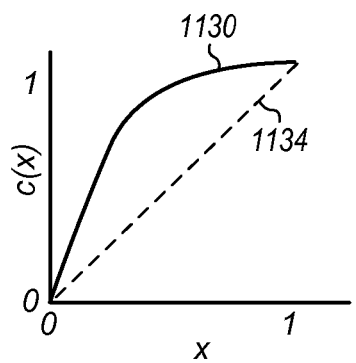
Figure 11D:
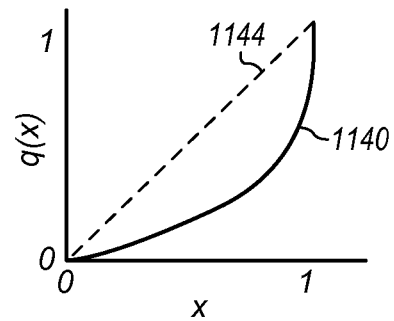

FIGS. 11A-11D illustrate a computation of particle trajectory according to different falloff function components, according to some embodiments. For example, FIG. 11A illustrates a particle trajectory 1108 for an individual particle emitted from the tip 1102 of airbrush tool 1100 based on particular values of altitude φ (labeled as 1110) and azimuth ψ (labeled as 1106). In this example, point 1112 represents the point at which the particle collides with canvas 1104. FIG. 11B illustrates a target falloff function 1120 for the distribution of paint in the mark being made by airbrush 1100 (including the mark made at 1112 by an individual particle emitted by airbrush 1100). In this example, the falloff function y(x) represents the paint distribution as a function of the normalized radial distance x. FIG. 11C illustrates the corresponding cumulative distribution function (CDF) 1130 as a function of x, and a reference line 1134 along which y=x. In this example, FIG. 11D illustrates the corresponding inverse cumulative distribution function (ICDF) 1140 as a function of x, and a reference line 1144 along which y=x.

Figure 12:
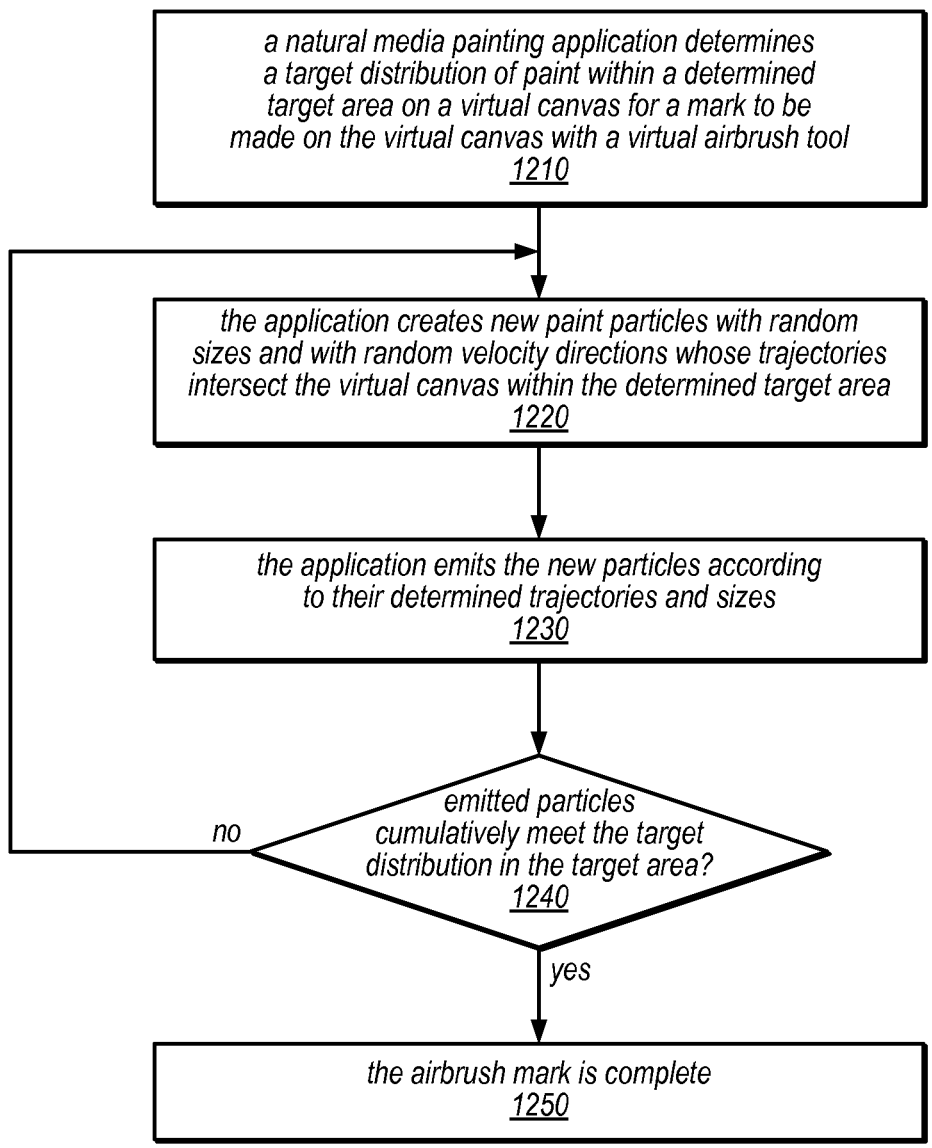
FIG. 12 is a flow diagram illustrating one embodiment of a method for creating a mark with a virtual airbrush tool using particles in a natural media painting application.

One embodiment of a method for creating a mark with a virtual airbrush tool using particles in a natural media painting application is illustrated by the flow diagram in FIG. 12. As illustrated in this example, the method may include a natural media painting application determining a target distribution of paint within a determined target area on a virtual canvas for a mark to be made on the virtual canvas with a virtual airbrush tool (as in 1210). In some embodiments, the target area may be determined as in the examples described above (e.g., it may be defined by the intersection of a 3D cone of projection that represents the spray of the paint with the virtual canvas). Similarly, the target distribution of paint may be determined as in the examples above (e.g., it may be dependent on a falloff function, which may in turn be dependent on the value of a configurable hardness parameter), in some embodiments.

As illustrated in this example, the method may include the application creating multiple new paint particles with random sizes and with random velocity directions whose trajectories intersect the canvas within the determined target area (as in 1220). For example, in some embodiments, the individual paint particles emitted by the virtual airbrush may vary in size over a range bounded by the value of a configurable minimum particle size and the value of a configurable maximum particle size, and the distribution of particle sizes emitted at a given airbrush step (e.g., in a single "burst" from the virtual airbrush tool) may be dependent on a uniform random variable (or a squared uniform random variable), as described above. As described above, the trajectory of each particle (and thus its direction of velocity) may be dependent on two random numbers, the altitude φ and azimuth ψ.

As illustrated at 1230, the method may include the application emitting the new paint particles according to their determined trajectories and sizes. As illustrated in FIG. 12, the operations illustrated in 1220 and 1240 may be repeated if the emitted paint particles do not meet the target distribution in the target area (shown as the feedback from the negative exit of 1240 to 1220). Once the emitted paint particles cumulatively meet the target distribution in the target area (shown as the positive exit from 1240), the airbrush mark is complete (as in 1250). In other words, when the particle-based digital airbrushing technique described above is used to create a mark on a virtual canvas, the virtual airbrush may be configured to deposit an amount of paint in the target area (as multiple individual particles of paint) that is sufficient to meet the target distribution. Note that in some embodiments, the number of particles emitted by the airbrush tool at any given step during a stroke may be fixed or pre-determined (e.g., it may be computed based on the size of the target area, the flow rate of the paint and/or other factors, or may be selected by the user). In some such embodiments, the sizes and/or velocity directions of the individual particles may be determined such that the target distribution will be met by the deposition of those individual particles in a single "burst" from the virtual airbrush having the fixed or pre-determined number of individual particles (e.g., in a single pair of the operations illustrated as 1220 and 1230 in FIG. 12).

In some cases, artists may not want a virtual airbrush tool that produces marks that are either entirely smooth or entirely granular. Therefore, in some embodiments, a natural media painting application may support a hybrid mode in which airbrush marks made with a virtual airbrush tool can be created that combine both effects. For example, when examining real-world airbrush strokes, spatter begins to be apparent around the edges of the stroke, and then as spatter increases, it may encroach more on the center of the stroke, as well. In some embodiments, a natural media painting application may employ a configurable "granularity" parameter g having a range of values from zero to one such that when g=0, the stroke made by the virtual airbrush tool is made up entirely of projected texture, and when g=1, the stroke made by the virtual airbrush tool is made up entirely of individual particles. In some embodiments, to achieve this hybrid mode, the application may modify both the texture projections and particle distributions described herein based on a specified value of the granularity parameter g. In other words, in a natural media painting application that supports a hybrid mode for digital airbrushing, the value of a granularity parameter may control the relative effects of the projection-based digital airbrushing techniques and the particle-based digital airbrushing techniques (i.e., the mix of projected texture and individual paint particles that is used to create a given airbrush mark).

For example, in some embodiments, a target texture projection computed for a given airbrush mark (e.g., a target projection area and a target distribution/falloff for a desired mark that have been computed as described above) may be modified first. In such embodiments, as the value of the granularity parameter increases (e.g., as it approaches 1), the projected cone may be correspondingly reduced (creating a smaller mark), and the mark may be made lighter by modulating the deposition of paint (e.g., modulating the paint deposition by 1−g). In other words, only a portion of the desired mark may be produced using the projection-based digital airbrushing techniques described above when the value of the granularity parameter is between zero and one.

Subsequently, individual paint particles may be added (using the particle-based digital airbrushing techniques described herein) to complete the airbrush mark (e.g., to make up the difference between the mark made using the reduced texture projection and the originally computed distribution/falloff for the desired airbrush mark). For example, in some embodiments, when g=0, the texture projection mark has the same output as the originally computed distribution/falloff for the desired airbrush mark, and no paint particles are generated. As the value of the granularity parameter approaches one, the texture projection makes up less than the originally computed distribution/falloff, and the virtual airbrush tool may be configured to create and emit individual paint particles to make up the difference. In some embodiments, in order to emit particles with the right density to make up for the reduced texture projection, the PDF used for the particles may be adjusted from the PDF that would be used in the particle-based digital airbrushing techniques described above. Specifically, if y(x) represents the desired distribution/falloff and t(x) represents the distribution/falloff of the reduced texture projection mark, then p(x)=y(x)−t(x) may represent the desired distribution/falloff for the particles to be added. Subsequently, p(x) may be used to compute the ICDF used for generating particle velocities.

This hybrid approach to digital airbrushing may be quantified, for a desired falloff y(x) given by hardness h, and granularity g as follows:

$$t(x) = (1-g)y\left(\frac{x}{1-g}\right) \quad (4)$$

$$p(x) = y(x) - t(x) \quad (5)$$

Figure 13A:
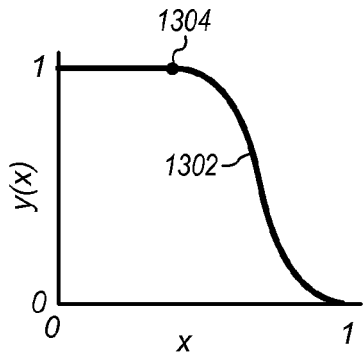
FIGS. 13A-13C illustrate the hybridization of falloff functions, according to some embodiments.
Figure 13B:
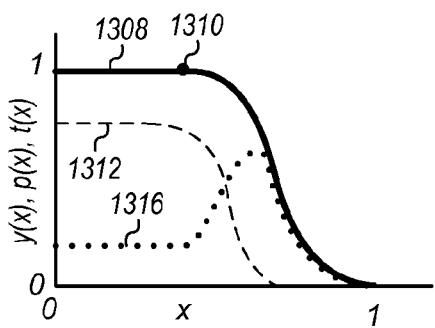
Figure 13C:
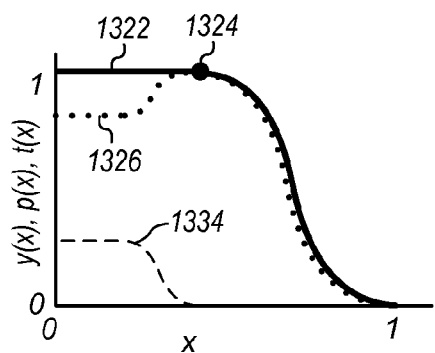

FIGS. 13A-13C illustrate the hybridization of falloff functions, according to some embodiments. For example, FIG. 13A illustrates a target falloff function 1302. In this example, the falloff function is expressed as a function of the normalized radial distance x. In this example, the target distribution corresponds to a hardness value of 0.5, and the constant point is shown at 1304. FIG. 13B illustrates the same target falloff function as function 1302 of FIG. 13A as a composite falloff function 1308. In this example, composite falloff function 1308 is made up of a texture falloff function 1312 and a particle falloff function 1316, and the granularity is 0.75. Therefore, in this example, the projection and intensity of the portion of the mark created using the projection-based techniques described herein are reduced by (1−g), or 25% (e.g., the distribution covers the normalized radial distances in the range from 0 to 0.75, rather than from 0 to 1), and the particle-based techniques described herein are used to complete the mark (i.e., to fill in the mark according to the target composite distribution). FIG. 13C illustrates the same target falloff function as function 1302 of FIG. 13A as a composite falloff function 1322. In this example, composite falloff function 1322 is made up of a texture falloff function 1334 and a particle falloff function 1326, and the granularity is 0.25. Therefore, in this example, the projection and intensity of the portion of the mark created using the projection-based techniques described herein are reduced by (1−g), or 75% (e.g., the distribution covers the normalized radial distances in the range from 0 to 0.25, rather than from 0 to 1), and the particle-based techniques are used to complete the mark (i.e., to fill in the mark according to the target composite distribution).

Figure 14:
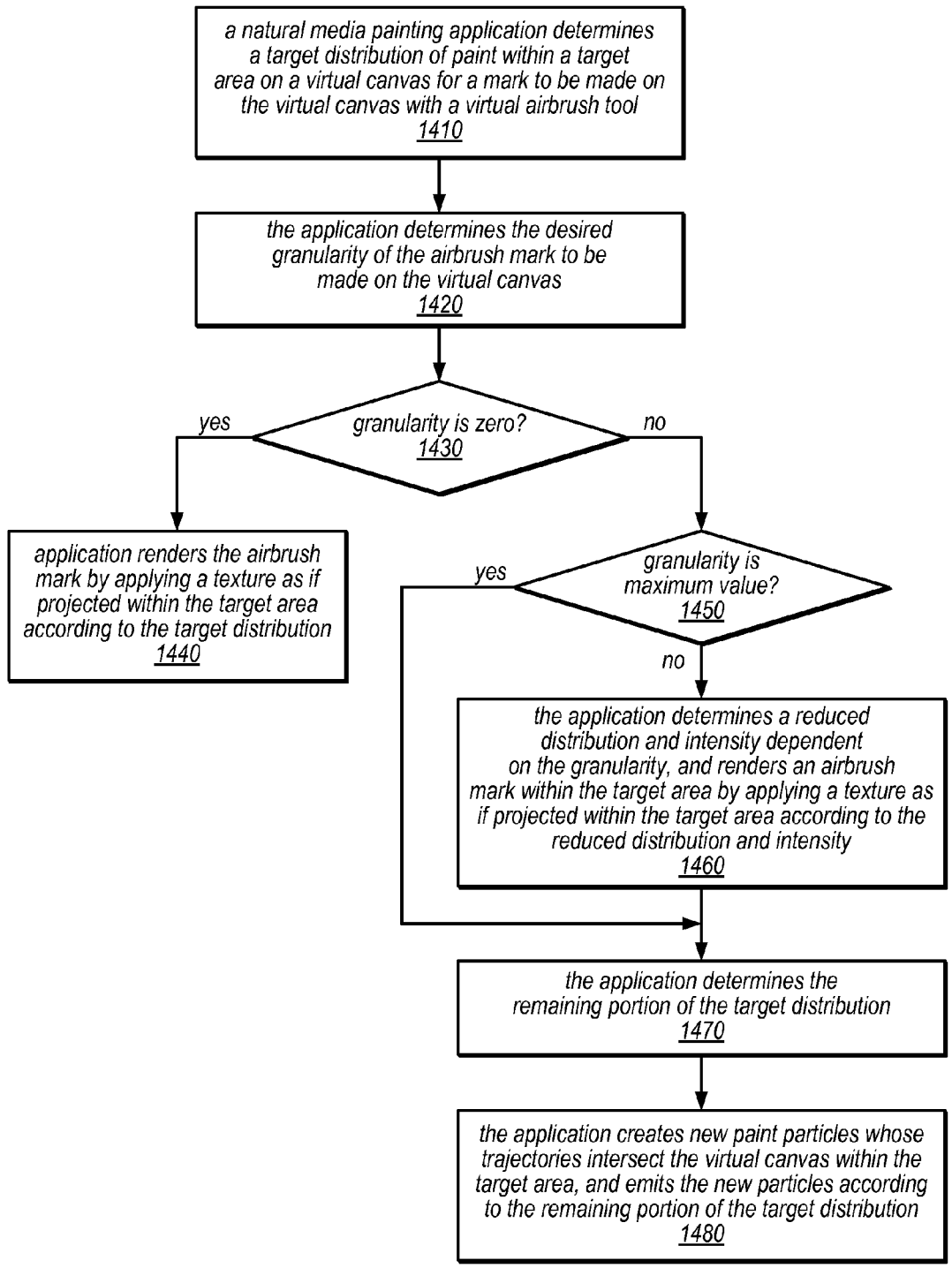
FIG. 14 is a flow diagram illustrating one embodiment of a hybrid method for creating a mark with a virtual airbrush tool using projection and/or particle deposition in a natural media painting application.

One embodiment of a hybrid method for creating a mark with a virtual airbrush tool using projection and/or particle deposition is illustrated by the flow diagram in FIG. 14. As illustrated in this example, the method may include a natural media painting application determining a target distribution of paint within a target area on a virtual canvas for a mark to be made on the virtual canvas with a virtual airbrush tool (as in 1410). In some embodiments, the target area may be determined as in the examples described above (e.g., it may be defined by the intersection of a 3D cone of projection that represents the spray of the paint with the virtual canvas). Similarly, the target distribution of paint may be determined as in the examples above (e.g., it may be dependent on a falloff function, which may in turn be dependent on the value of a configurable hardness parameter), in some embodiments.

As illustrated in this example, the method may include the application determining the desired granularity of the airbrush mark to be made on the virtual canvas (as in 1420). For example, in some embodiments, the desired granularity may be specified by the user by setting the value of a configurable granularity parameter of the application. If the desired granularity is zero (shown as the positive exit from 1430), the method may include the application rendering the airbrush mark by applying a texture as if it were projected within the target area according to the target distribution (as in 1440). In other words, if the granularity parameter is set to zero, the virtual airbrush tool may be configured to create an airbrush mark on the virtual canvas using only a projection technique (e.g., as illustrated in FIG. 10 and as described herein) and without depositing any paint as individual paint particles.

As illustrated in this example, if the value of the granularity parameter is non-zero, but is not equal to a maximum granularity value (shown as the negative exit from 1430 and the negative exit from 1450), the method may include the application determining a reduced distribution and intensity dependent on the desired granularity, and rendering an airbrush mark within the target area by applying a texture as if it were projected within the target area according to the reduced distribution and intensity (i.e., by performing a modulated paint deposition that is dependent on the granularity), as in 1460. In this case, the method may also include the application determining the remaining portion of the target distribution (as in 1470). The method may then include the application creating new paint particles whose trajectories intersect the canvas within the target area, and emitting the new particles according to the remaining portion of the target distribution (as in 1480). In other words, when the value of the granularity parameter is non-zero but is less than a pre-determined maximum granularity value (which may be 1, in a system in which the granularity is represented by a normalized granularity value), the virtual airbrush tool may be configured to render an airbrush mark using a hybrid technique in which an initial mark is created on the virtual canvas using a projection technique, and then individual paint particles are emitted to complete the airbrush mark. As noted above, this hybrid technique may create airbrush marks that closely resemble real-world airbrush marks.

Note, however, that if the desired granularity value represents a maximum granularity (shown as the positive exit from 1450), the method may omit the operations illustrated at element 1460 and may continue at element 1470. In this case, the "remaining" portion of the target distribution is the same as the original target distribution (i.e., the entire target distribution determined at element 1410). In other words, when the value of the granularity parameter is equal to a pre-determined maximum granularity value (which may be 1, in a system in which the granularity is represented by a normalized granularity value), the virtual airbrush tool may be configured to render an airbrush mark entirely by emitting individual paint particles (e.g., as illustrated in FIG. 12 and described herein) and without applying the projection techniques described herein.

Figure 15A:
FIGS. 15A-15I illustrate examples of airbrush strokes showing the effects of various parameter values, according to one embodiment.
Figure 15B:
Figure 15C:
Figure 15D:

FIGS. 15A-15I illustrate examples of airbrush strokes showing the effects of different parameter values, according to some embodiments. Specifically, FIG. 15A illustrates a long airbrush stroke made with a high flow rate during which tilt is varied and the hardness value h=100%; FIG. 15B illustrates the effect of varying tilt when making a series of airbrush marks when the hardness value h=100%; FIG. 15C illustrates the effect of varying pressure when making a series of airbrush marks when the hardness value h=0%; and FIG. 15D illustrates a long airbrush stroke made with a high flow rate during which pressure is varied and the hardness value h=0%.

Figure 15E:
Figure 15F:
Figure 15G:
Figure 15H:
Figure 15I:

FIG. 15E illustrates a stroke made with a granularity parameter value of 100%; FIG. 15F illustrates a stroke made with a granularity parameter value of 100% and a hardness value of 100%; FIG. 15G illustrates a stroke made with a granularity parameter value of 75% and a hardness value of 0%; FIG. 15H illustrates a stroke made with a granularity parameter value of 50%; and FIG. 15I illustrates a stroke made with a granularity parameter value of 25%.

Figure 16:
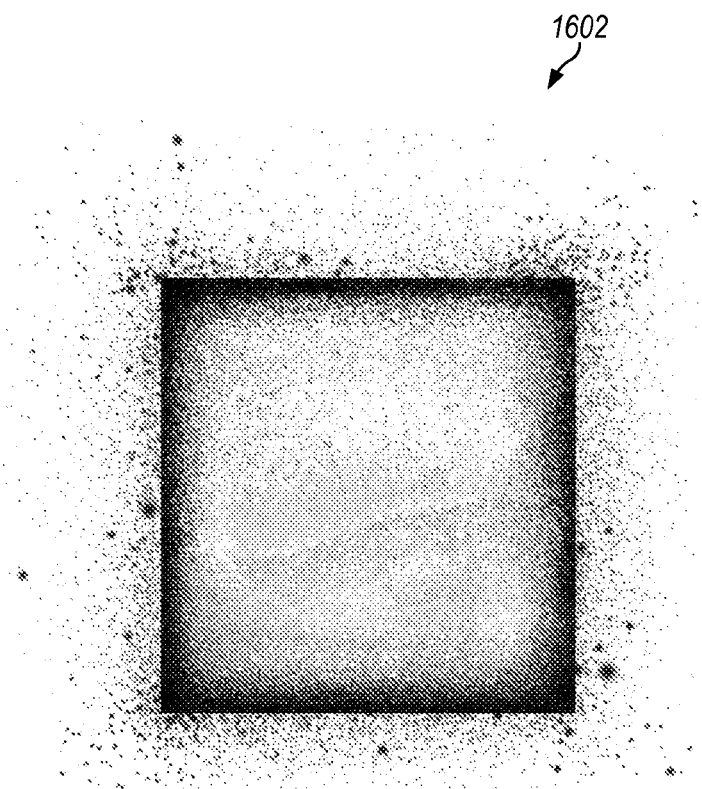
FIG. 16 illustrates an example of a work of art created with a virtual airbrush tool, according to one embodiment.

FIG. 16 illustrates an example of a work of art 1602 created with a virtual airbrush tool such as that described herein, according to one embodiment.

As previously noted, some commercial painting apps include airbrush tools. However, unlike in existing applications, the natural media painting applications and digital airbrushing techniques described herein may support expressive particle-based effects and the ability to continuously vary them to create many different styles of stroke.

Figure 17:
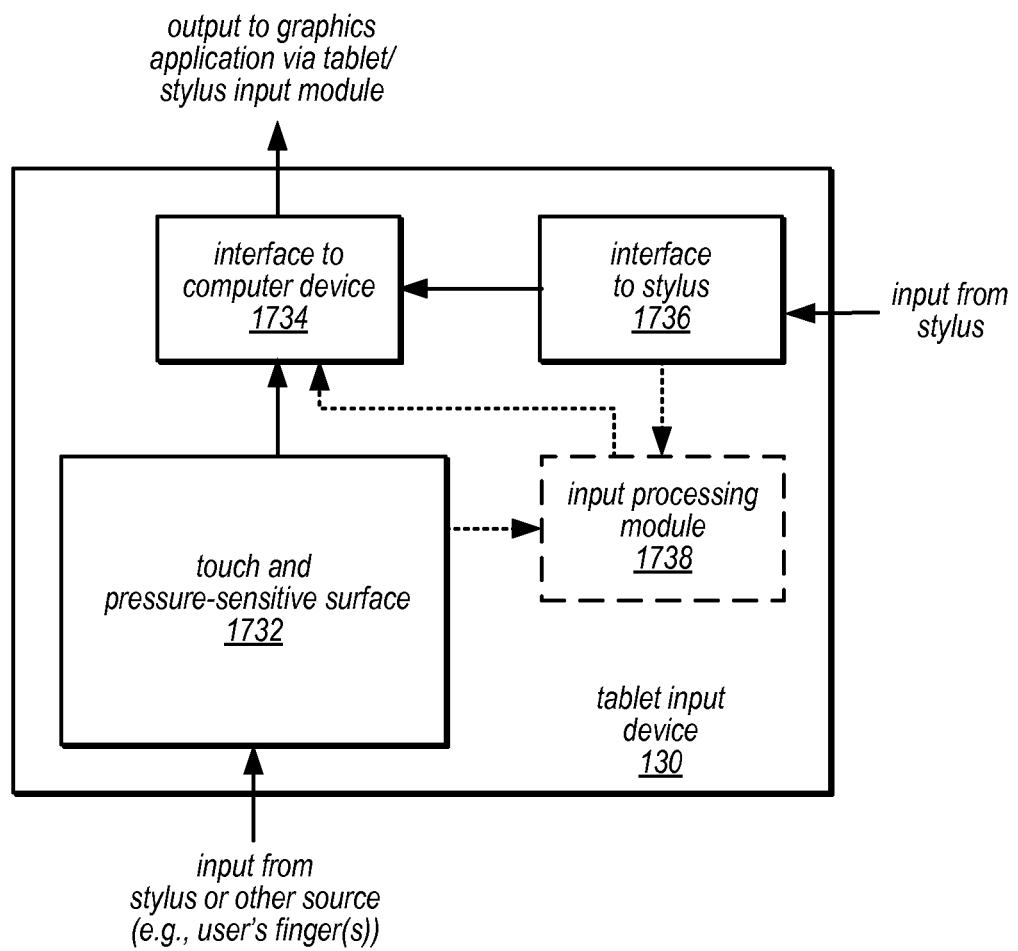
FIG. 17 illustrates various components of tablet input device, according to some embodiments.

FIG. 17 illustrates components of an example tablet input device according to some embodiments. As illustrated in this example, tablet 130 may include a touch and pressure-sensitive surface 1732 that may be configured to detect contact with tip 442 of stylus 140, and/or contact with another object such as the user's fingertip or knuckle. Surface 1732 may also be configured to detect motion on the surface, for example detecting the dragging of tip 442 of stylus 140 across the surface. Surface 1732 may also be configured to detect the amount of pressure applied to the surface, e.g., by stylus 140, another object, or a user touch. Tablet 130 may also include an interface to stylus 1736 that is configured to detect the position of, and motion of, stylus 140 in relation to tablet 130, for example by receiving input from stylus 140 via a wireless interface, or alternatively via one or more motion detectors integrated in or coupled to tablet 130 that are configured to track the motion and position of stylus 140. In some embodiments, tablet 130 and/or stylus 140 may include a camera, through which input about the position and/or motion of stylus 140 may be collected (not shown), or such a camera may included as an additional component of the system separate from tablet 130 and stylus 140. In some embodiments, tablet 130 may also include an input processing module 1738 configured to process input received via interface to stylus 1736 and/or surface 1732.

Input processing module 1738 may also include an interface to computer device 1734. Interface 1734 may be a wired or wireless interface. Interface 1734 may be configured to communicate information collected from interface 1736 and/or surface 1732 to a computer device such as computer device 100 of FIG. 1. A graphics application on the computer device, such as graphics application 120 of FIG. 1, may interpret the information to detect various gestures and to perform various painting actions in response to the detected gestures for creating or editing the content of images, as described herein. In some embodiments, input processing module 1738 may be configured to perform at least some of the functionality of detecting and/or recognizing various gestures. Thus, in some embodiments, tablet 130 may be configured to detect/recognize gestures and communicate the gestures to a graphics application via interface 1734. The graphics application may then perform the appropriate painting actions in response to the gestures.

Some embodiments may include a means for detecting poses and gestures made using a stylus, a tablet type input device, and/or a combination of a stylus and a tablet type input device. For example, a tablet/stylus input module may present an interface through which various poses or gestures representing actions to be taken or painting effects to be applied in a natural media painting application (e.g., mode changes and/or painting operations) may be detected (e.g., using collected motion information, pressure data, etc.) and recognized, and may generate and store data representing the detected poses or gestures for use in various image editing operations in the natural media painting application, as described herein. The tablet/stylus input module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform presenting an interface through which various poses or gestures may be detected and recognized, detecting and recognizing those poses or gestures, and generating and storing data representing those poses or gestures for subsequent use in the natural media painting application, as described herein. Other embodiments of the tablet/stylus input module may be at least partially implemented by hardware circuitry and/or firmware stored, for example, in a non-volatile memory.

Some embodiments may include a means for mapping detected poses and/or gestures made using a stylus and/or tablet type input device to various functions of a natural media painting application. For example, in some embodiments, a pose/gesture mapping module may receive input specifying various poses or gestures that have been detected, may determine actions to be taken in a natural media painting application (e.g., image editing operations to be performed using a brush tool in the application, or painting/drawing effects to be applied in the application) in response to that input, and may generate and store data representing the actions to be taken or the effects to be applied in the natural media painting application, as described herein. In other embodiments, the pose/gesture mapping module may receive input specifying various pose parameter values, may map that input to the pose of a virtual airbrush tool, may determine a conical shape representing the spray of paint from the virtual airbrush tool based on the pose of the virtual airbrush tool, may determine a target area on a virtual canvas in which to deposit paint dependent on the intersection of the conical shape and the virtual canvas and a target distribution for the paint to be deposited in the target area, and may deposit paint in the target area (according to the target distribution) as a texture projection and/or as multiple individual paint particles, as described herein. The pose/gesture mapping module may in some embodiments be implemented by a non-transitory, computer-readable storage medium and one or more processors (e.g., CPUs and/or GPUs) of a computing apparatus. In some embodiments, the computer-readable storage medium may store program instructions executable by the one or more processors to cause the computing apparatus to perform receiving input specifying various stylus poses or gestures that have been detected, determining actions to be taken or effects to be applied in a natural media painting application in response to that input, and generating and storing data representing the actions to be taken or the effects to be applied in the natural media painting application, as described herein. In other embodiments, the computer-readable storage medium may store program instructions executable by the one or more processors to cause the computing apparatus to perform receiving input specifying various pose parameter values, mapping that input to the pose of a virtual airbrush tool, determining a conical shape representing the spray of paint from the virtual airbrush tool based on the pose of the virtual airbrush tool, determining a target area on a virtual canvas in which to deposit paint dependent on the intersection of the conical shape and the virtual canvas and a target distribution for the paint to be deposited in the target area, and depositing paint in the target area (according to the target distribution) as a texture projection and/or as multiple individual paint particles, as described herein. Still other embodiments of the pose/gesture mapping module may be at least partially implemented by hardware circuitry and/or firmware stored, for example, in a non-volatile memory.

Some embodiments may include a means for simulating the behavior of various types of brushes in a natural media painting application. For example, a painting simulation module (which may include a brush model), may receive input specifying various painting actions to be performed in a natural media painting application (e.g., image editing operations to be performed using a brush tool in the application) in response to tablet and/or stylus input, and may generate and store data representing an image that has been modified by the various image editing operations in the natural media painting application, as described herein. The painting simulation module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving input specifying various painting actions to be performed in a natural media painting application (e.g., image editing operations to be performed using a brush tool in the application) in response to tablet and/or stylus input, and generating and storing data representing an image that has been modified by the various image editing operations in the natural media painting application, as described herein. Other embodiments of the painting simulation module may be at least partially implemented by hardware circuitry and/or firmware stored, for example, in a non-volatile memory.

Example Computer System

Figure 18:
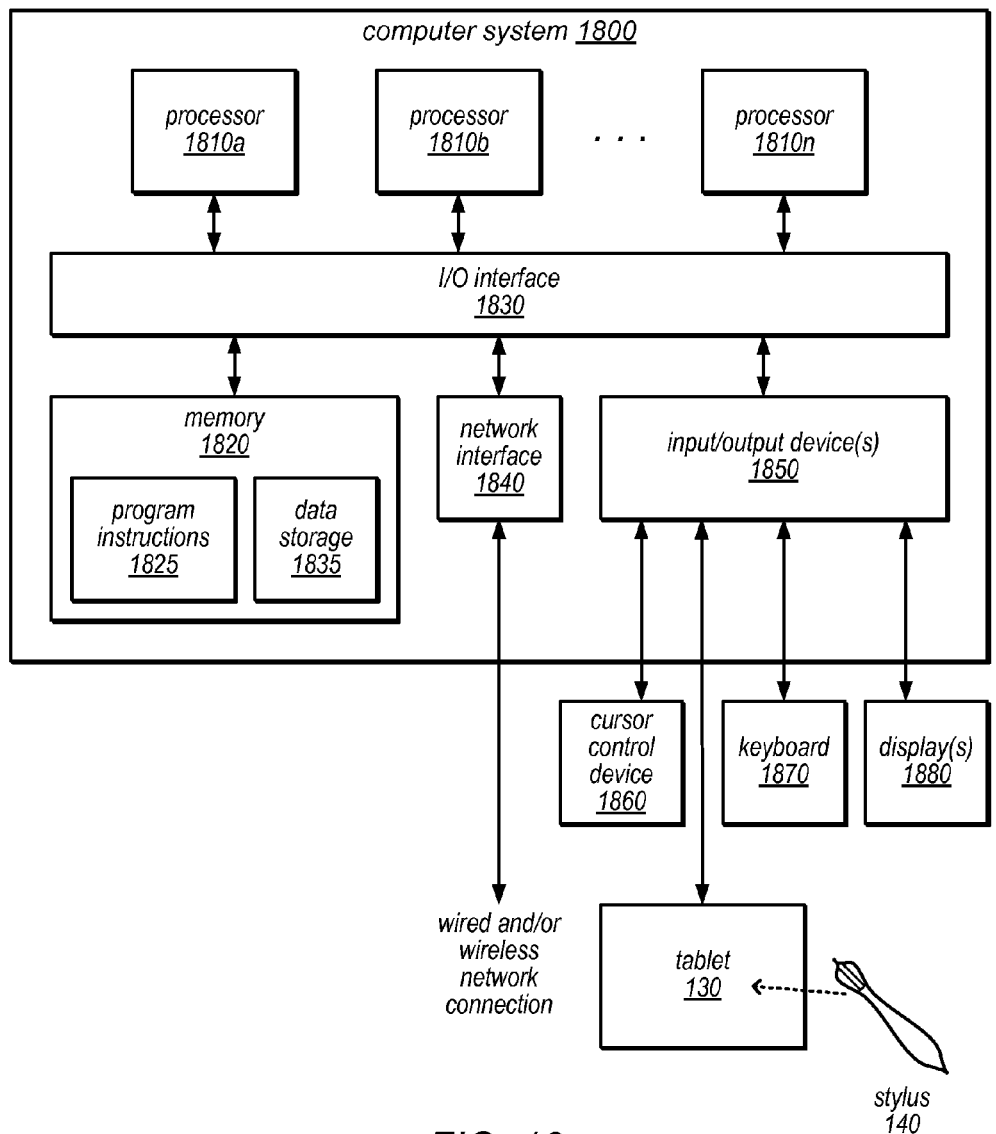
FIG. 18 is a block diagram illustrating an example computer system that implements the natural media painting techniques described herein, according to some embodiments.

The methods illustrated and described herein may be executed on one or more computer systems, which may interact with other devices, according to various embodiments. One such computer system is illustrated in FIG. 18. In the illustrated embodiment, computer system 1800 includes one or more processors 1810 coupled to a system memory 1820 via an input/output (I/O) interface 1830. Computer system 1800 further includes a network interface 1840 coupled to I/O interface 1830, and one or more input/output devices 1850, such as cursor control device 1860, keyboard 1870, audio device 1890, and display(s) 1880. Input/output devices 1850 include a tablet 130 and stylus 140 for enabling natural media painting using a realistic brush and tablet stylus gestures as described herein. In some embodiments, it is contemplated that embodiments may be implemented using a single instance of computer system 1800, while in other embodiments multiple such systems, or multiple nodes making up computer system 1800, may be configured to host different portions or instances of embodiments. For example, in one embodiment some elements may be implemented via one or more nodes of computer system 1800 that are distinct from those nodes implementing other elements.

In various embodiments, computer system 1800 may be a uniprocessor system including one processor 1810, or a multiprocessor system including several processors 1810 (e.g., two, four, eight, or another suitable number). Processors 1810 may be any suitable processor capable of executing instructions. For example, in various embodiments, processors 1810 may be general-purpose or embedded processors implementing any of a variety of instruction set architectures (ISAs), such as the x86, PowerPC, SPARC, or MIPS ISAs, or any other suitable ISA. In multiprocessor systems, each of processors 1810 may commonly, but not necessarily, implement the same ISA.

In some embodiments, at least one processor 1810 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods as illustrated and described in the accompanying description may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1820 may be configured to store program instructions and/or data accessible by processor 1810. In various embodiments, system memory 1820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those for methods as illustrated and described in the accompanying description, are shown stored within system memory 1820 as program instructions 1825 and data storage 1835, respectively. In other embodiments, program instructions and/or data may be received, sent or stored upon different types of computer-accessible media or on similar media separate from system memory 1820 or computer system 1800. Generally speaking, a computer-accessible medium may include storage media or memory media such as magnetic or optical media, e.g., disk or CD/DVD-ROM coupled to computer system 1800 via I/O interface 1830. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1840.

In one embodiment, I/O interface 1830 may be configured to coordinate I/O traffic between processor 1810, system memory 1820, and any peripheral devices in the device, including network interface 1840 or other peripheral interfaces, such as input/output devices 1850, including tablet 130 and stylus 140. In some embodiments, I/O interface 1830 may perform any necessary protocol, timing or other data transformations to convert data signals from one component (e.g., system memory 1820) into a format suitable for use by another component (e.g., processor 1810). In some embodiments, I/O interface 1830 may include support for devices attached through various types of peripheral buses, such as a variant of the Peripheral Component Interconnect (PCI) bus standard or the Universal Serial Bus (USB) standard, for example. In some embodiments, the function of I/O interface 1830 may be split into two or more separate components, such as a north bridge and a south bridge, for example. In addition, in some embodiments some or all of the functionality of I/O interface 1830, such as an interface to system memory 1820, may be incorporated directly into processor 1810.

Network interface 1840 may be configured to allow data to be exchanged between computer system 1800 and other devices attached to a network, such as other computer systems, or between nodes of computer system 1800. In various embodiments, network interface 1840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1850 may, in some embodiments, include one or more display terminals, keyboards, keypads, touchpads, scanning devices, voice or optical recognition devices, tablets and stylus, or any other devices suitable for entering or retrieving data by one or more computer system 1800. Multiple input/output devices 1850 may be present in computer system 1800 or may be distributed on various nodes of computer system 1800. In some embodiments, similar input/output devices may be separate from computer system 1800 and may interact with one or more nodes of computer system 1800 through a wired or wireless connection, such as over network interface 1840.

As shown in FIG. 18, memory 1820 may include program instructions 1825, configured to implement embodiments of methods as illustrated and described in the accompanying description, and data storage 1835, comprising various data accessible by program instructions 1825. In one embodiment, program instructions 1825 may include software elements of methods as illustrated and described in the accompanying description, including a tablet/stylus input module, painting simulation module, brush model, and/or pose/gesture mapping module. Data storage 1835 may include data that may be used by these and other modules in some embodiments. For example, it may store collected pose parameter values, mappings between various poses and painting/drawing actions, values of various default and/or user-configurable parameters (including, but not limited to those representing brush type selections, stamp type selections, an amount of ink, a pigment concentration amount, a transparency value, a brush width, a bristle stiffness, a "hardness" value, a cutoff angle, a particle count, a minimum particle size, a maximum particle size, a granularity value, a maximum granularity value, and/or any other default or user-configurable parameters described herein). In other embodiments, more, fewer or different software elements and/or data may be included in memory 1820.

Those skilled in the art will appreciate that computer system 1800 is merely illustrative and is not intended to limit the scope of methods as illustrated and described in the accompanying description. In particular, the computer system and devices may include any combination of hardware or software that can perform the indicated functions, including computers, network devices, internet appliances, PDAs, wireless phones, pagers, etc. Computer system 1800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1800 may be transmitted to computer system 1800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the systems and methods described herein may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent examples of embodiments of methods. The methods may be implemented in software, hardware, or a combination thereof. The order of method may be changed, and various elements may be added, reordered, combined, omitted, modified, etc. Various modifications and changes may be made as would be obvious to a person skilled in the art having the benefit of this disclosure. It is intended that the disclosure embrace all such modifications and changes and, accordingly, the above description to be regarded in an illustrative rather than a restrictive sense.

What is claimed is:

1. A method, comprising:
performing by a computer:
  collecting information about the pose of a stylus that represents an airbrush tool during a stroke made by the stylus on a tablet;
  determining a conical shape with which to model paint spraying from the tip of the airbrush tool, the determining the conical shape comprises constructing a three-dimensional geometry representing the spray of the paint dependent on the collected information;
  determining a target area on a virtual canvas in which to deposit the paint, the determining the target area comprises determining an intersection of the three-dimensional geometry and the virtual canvas;
  determining a target distribution for depositing the paint within the target area;
  depositing paint within the target area on the virtual canvas dependent on the determined target distribution, the depositing paint comprises depositing at least a portion of the paint as a plurality of individual particles of paint sprayed on the virtual canvas by the airbrush tool; and
  storing data representing an image that includes the deposited paint.

2. The method of claim 1, wherein the portion of the paint that is deposited as a plurality of individual particles of paint is dependent on a configurable granularity parameter value.

3. The method of claim 2, wherein the granularity parameter value represents a maximum granularity, and wherein said depositing at least a portion of the paint comprises depositing an amount of paint in the target area as a plurality of individual particles of paint that is sufficient to meet the target distribution.

4. The method of claim 1, wherein the plurality of individual particles comprises particles of multiple sizes in a range of particle sizes bounded by a configurable minimum particle size value and a configurable maximum particle size value, and wherein the sizes of the individual particles are distributed across the range of particle sizes dependent on a uniform random variable.

5. The method of claim 1, wherein each of the plurality of individual particles is sprayed on the virtual canvas from the tip of the airbrush tool with a random direction of velocity such that the individual particle collides with the virtual canvas within the target area in accordance with the target distribution.

6. The method of claim 1, wherein said determining a target distribution comprises determining a falloff function dependent on a configurable hardness parameter value.

7. The method of claim 1, wherein the number of individual particles of paint sprayed on the virtual canvas by the airbrush tool at a given point during the stroke is dependent on a configurable particle count value.

8. The method of claim 1, wherein said depositing paint further comprises depositing another portion of the paint as a texture projected within the target area, and wherein the portion of the paint deposited as a plurality of individual particles and the other portion of the paint deposited as a texture projected within the target area are sufficient, collectively, to meet the target distribution.

9. The method of claim 8, wherein said determining a conical shape is dependent on one or more of a configurable cutoff angle or the pressure exerted by the stylus on the tablet.

10. The method of claim 1, wherein said collecting information about the pose of a stylus comprises collecting information about the position and orientation of the stylus.

11. A system, comprising:
at least one processor; and a memory coupled to the at least one processor, wherein the memory stores program instructions that when executed by the at least one processor to cause the at least one processor to perform:
- collecting information about the pose of a stylus that represents an airbrush tool during a stroke made by the stylus on a tablet;
- determining a conical shape with which to model paint spraying from the tip of the airbrush tool, the determining the conical shape comprises constructing a three-dimensional geometry representing the spray of the paint dependent on the collected information;
- determining a target area on a virtual canvas in which to deposit the paint, the determining the target area comprises determining an intersection of the three-dimensional geometry and the virtual canvas;
- determining a target distribution for depositing the paint within the target area;
- depositing paint within the target area on the virtual canvas dependent on the determined target distribution, the depositing paint comprises depositing at least a portion of the paint as a plurality of individual particles of paint sprayed on the virtual canvas by the airbrush tool; and
- storing data representing an image that includes the deposited paint.

12. The system of claim 11, wherein the portion of the paint that is deposited as a plurality of individual particles of paint is dependent on a configurable granularity parameter value.

13. The system of claim 11,
- wherein the plurality of individual particles comprises particles of multiple sizes in a range of particle sizes bounded by a configurable minimum particle size value and a configurable maximum particle size value, and wherein the sizes of the individual particles are distributed across the range of particle sizes dependent on a uniform random variable; and
- wherein each of the plurality of individual particles is sprayed on the virtual canvas from the tip of the airbrush tool with a random direction of velocity such that the individual particle collides with the virtual canvas within the target area in accordance with the target distribution.

14. The system of claim 11, wherein said determining a target distribution comprises determining a falloff function dependent on a configurable hardness parameter value.

15. The system of claim 11, wherein said depositing paint further comprises depositing another portion of the paint as a texture projected within the target area, and wherein the portion of the paint deposited as a plurality of individual particles and the other portion of the paint deposited as a texture projected within the target area are sufficient, collectively, to meet the target distribution.

16. A non-transitory, computer-readable storage medium storing program instructions that when executed on one or more computers cause the one or more computers to perform:
- collecting information about the pose of a stylus that represents an airbrush tool during a stroke made by the stylus on a tablet;
- determining a conical shape with which to model paint spraying from the tip of the airbrush tool, the determining the conical shape comprises constructing a three-dimensional geometry representing the spray of the paint dependent on the collected information;
- determining a target area on a virtual canvas in which to deposit the paint, the determining the target area comprises determining an intersection of the three-dimensional geometry and the virtual canvas;
- determining a target distribution for depositing the paint within the target area;
- depositing paint within the target area on the virtual canvas dependent on the determined target distribution, the depositing paint comprises depositing at least a portion of the paint as a plurality of individual particles of paint sprayed on the virtual canvas by the airbrush tool; and
- storing data representing an image that includes the deposited paint.

17. The non-transitory, computer-readable storage medium of claim 16, wherein the portion of the paint that is deposited as a plurality of individual particles of paint is dependent on a configurable granularity parameter value.

18. The non-transitory, computer-readable storage medium of claim 16,
- wherein the plurality of individual particles comprises particles of multiple sizes in a range of particle sizes bounded by a configurable minimum particle size value and a configurable maximum particle size value, and wherein the sizes of the individual particles are distributed across the range of particle sizes dependent on a uniform random variable; and
- wherein each of the plurality of individual particles is sprayed on the virtual canvas from the tip of the airbrush tool with a random direction of velocity such that the individual particle collides with the virtual canvas within the target area in accordance with the target distribution.

19. The non-transitory, computer-readable storage medium of claim 16, wherein said determining a target distribution comprises determining a falloff function dependent on a configurable hardness parameter value.

20. The non-transitory, computer-readable storage medium of claim 16, wherein said depositing paint further comprises depositing another portion of the paint as a texture projected within the target area, and wherein the portion of the paint deposited as a plurality of individual particles and the other portion of the paint deposited as a texture projected within the target area are sufficient, collectively, to meet the target distribution.

* * * * *